US011099202B2

(12) United States Patent
Amorese et al.

(10) Patent No.: US 11,099,202 B2
(45) Date of Patent: Aug. 24, 2021

(54) REAGENT DELIVERY SYSTEM

(71) Applicant: NuGen Technologies, Inc., San Carlos, CA (US)

(72) Inventors: Douglas A. Amorese, San Carlos, CA (US); Nitin Sood, Los Altos, CA (US); Philip John Rawlins, Orwell (GB); Sebastian Georg Rammensee, Upminster (GB); Michael Ian Walker, Cambridge (GB); Thomas William Broughton, Cambridge (GB); Michiel Clemens Rene Twisk, Cambridge (GB); Jonathan Patrick Casey, Cambridge (GB); Michael Roy Fairs, Cambs (GB); Neil Pollock, Hertfordshire (GB); Nuno Varelas, Royston (GB); Giles Hugo William Sanders, Cambridgeshire (GB)

(73) Assignee: TECAN GENOMICS, INC., Redwood City, CA (US)

( * ) Notice: Subject to any disclaimer, the term of this patent is extended or adjusted under 35 U.S.C. 154(b) by 0 days.

(21) Appl. No.: 15/789,660

(22) Filed: Oct. 20, 2017

(65) Prior Publication Data
US 2019/0120868 A1    Apr. 25, 2019

(51) Int. Cl.
*G01N 35/10* (2006.01)
*B01L 3/00* (2006.01)

(52) U.S. Cl.
CPC .......... *G01N 35/1002* (2013.01); *B01L 3/527* (2013.01); *B01L 2300/044* (2013.01); *B01L 2300/0829* (2013.01); *B01L 2300/123* (2013.01); *B01L 2400/0481* (2013.01); *B01L 2400/0683* (2013.01)

(58) Field of Classification Search
CPC .......................... B01L 3/50273; B65D 35/28
See application file for complete search history.

(56) References Cited

U.S. PATENT DOCUMENTS

| 4,362,867 A | 12/1982 | Paddock |
| 4,458,066 A | 7/1984 | Caruthers et al. |
| 4,469,863 A | 9/1984 | Ts'o et al. |

(Continued)

FOREIGN PATENT DOCUMENTS

| CA | 2444926 A1 | 11/2002 |
| CN | 1661102 A | 8/2005 |

(Continued)

OTHER PUBLICATIONS

Westin 2000, Anchored multiplex amplification on a microelectronic chip array, Nat Biotech 18:199-204.

(Continued)

*Primary Examiner* — Matthew D Krcha
(74) *Attorney, Agent, or Firm* — Brown Rudnick LLP; Thomas C. Meyers

(57) ABSTRACT

Prepackaged reagent reservoirs with associated nozzles allow for accurate, repeatable distribution of reagents in various types of reactions, reducing the risk of human error. Series of reservoirs may be arrayed on a sheet or plane for automated manipulation providing a simply format for organizing, storing, transporting, and distributing reagents needed in complex reactions such as those in the molecular biology field.

13 Claims, 10 Drawing Sheets

(56) References Cited

U.S. PATENT DOCUMENTS

| | | |
|---|---|---|
| 4,582,877 A | 4/1986 | Fairchok et al. |
| 4,876,187 A | 10/1989 | Duck et al. |
| 4,925,065 A * | 5/1990 | Golias .................. B01L 3/0282 222/189.06 |
| 4,935,357 A | 6/1990 | Szybalski |
| 4,942,124 A | 7/1990 | Church |
| 4,988,617 A | 1/1991 | Landegren et al. |
| 4,996,143 A | 2/1991 | Heller et al. |
| 5,011,769 A | 4/1991 | Duck et al. |
| 5,034,506 A | 7/1991 | Summerton et al. |
| 5,035,996 A | 7/1991 | Hartley |
| 5,043,272 A | 8/1991 | Hartley |
| 5,082,830 A | 1/1992 | Brakel et al. |
| 5,090,591 A | 2/1992 | Long |
| 5,130,238 A | 7/1992 | Malek et al. |
| 5,169,766 A | 12/1992 | Schuster et al. |
| 5,171,534 A | 12/1992 | Smith et al. |
| 5,194,370 A | 3/1993 | Berninger et al. |
| 5,216,141 A | 6/1993 | Benner |
| 5,234,809 A | 8/1993 | Boom et al. |
| 5,235,033 A | 8/1993 | Summerton et al. |
| 5,242,794 A | 9/1993 | Whiteley et al. |
| 5,384,242 A | 1/1995 | Oakes |
| 5,386,023 A | 1/1995 | Sanghvi et al. |
| 5,399,491 A | 3/1995 | Kacian et al. |
| 5,409,818 A | 4/1995 | Davey et al. |
| 5,418,149 A | 5/1995 | Gelfand et al. |
| 5,422,271 A * | 6/1995 | Chen .................. B01L 3/502 206/223 |
| 5,427,929 A | 6/1995 | Richards et al. |
| 5,480,784 A | 1/1996 | Kacian et al. |
| 5,494,810 A | 2/1996 | Barany et al. |
| 5,508,169 A | 4/1996 | Deugau et al. |
| 5,508,178 A | 4/1996 | Rose et al. |
| 5,510,270 A | 4/1996 | Fodor et al. |
| 5,525,471 A | 6/1996 | Zeng |
| 5,545,522 A | 8/1996 | Van Gelder et al. |
| 5,554,516 A | 9/1996 | Kacian et al. |
| 5,554,517 A | 9/1996 | Davey et al. |
| 5,556,752 A | 9/1996 | Lockhart et al. |
| 5,565,340 A | 10/1996 | Chenchik et al. |
| 5,573,913 A | 11/1996 | Rosemeyer et al. |
| 5,578,832 A | 11/1996 | Trulson et al. |
| 5,589,339 A | 12/1996 | Hampson et al. |
| 5,602,240 A | 2/1997 | De Mesmaeker et al. |
| 5,637,684 A | 6/1997 | Cook et al. |
| 5,641,658 A | 6/1997 | Adams et al. |
| 5,644,048 A | 7/1997 | Yau |
| 5,665,549 A | 9/1997 | Pinkel et al. |
| 5,667,976 A | 9/1997 | Van Ness et al. |
| 5,667,979 A | 9/1997 | Berrens |
| 5,679,512 A | 10/1997 | Laney et al. |
| 5,681,726 A | 10/1997 | Huse et al. |
| 5,683,879 A | 11/1997 | Laney et al. |
| 5,688,648 A | 11/1997 | Mathies et al. |
| 5,705,628 A | 1/1998 | Hawkins |
| 5,708,154 A | 1/1998 | Smith et al. |
| 5,710,028 A | 1/1998 | Eyal et al. |
| 5,712,126 A | 1/1998 | Weissman et al. |
| 5,716,785 A | 2/1998 | Van Gelder et al. |
| 5,726,329 A | 3/1998 | Jones et al. |
| 5,750,341 A | 5/1998 | Macevicz |
| 5,759,822 A | 6/1998 | Chenchik et al. |
| 5,763,178 A | 6/1998 | Chirikjian et al. |
| 5,789,206 A | 8/1998 | Tavtigian et al. |
| 5,824,517 A | 10/1998 | Cleuziat et al. |
| 5,824,518 A | 10/1998 | Kacian et al. |
| 5,837,832 A | 11/1998 | Chee et al. |
| 5,876,976 A | 3/1999 | Richards et al. |
| 5,882,867 A | 3/1999 | Ullman et al. |
| 5,888,779 A | 3/1999 | Kacian et al. |
| 5,888,819 A | 3/1999 | Goelet et al. |
| 5,945,313 A | 8/1999 | Hartley et al. |
| 5,952,176 A | 9/1999 | McCarthy et al. |
| 5,958,681 A | 9/1999 | Wetmur et al. |
| 5,965,409 A | 10/1999 | Pardee et al. |
| 5,969,119 A | 10/1999 | Macevicz |
| 5,972,618 A | 10/1999 | Bloch |
| 6,004,744 A | 12/1999 | Goelet et al. |
| 6,004,745 A | 12/1999 | Arnold, Jr. et al. |
| 6,027,889 A | 2/2000 | Barany et al. |
| 6,027,923 A | 2/2000 | Wallace |
| 6,030,774 A | 2/2000 | Laney et al. |
| 6,037,152 A | 3/2000 | Richards et al. |
| 6,056,661 A | 5/2000 | Schmidt |
| 6,077,674 A | 6/2000 | Schleifer et al. |
| 6,087,103 A | 7/2000 | Burmer |
| 6,090,553 A | 7/2000 | Matson |
| 6,090,591 A | 7/2000 | Burg et al. |
| 6,107,023 A | 8/2000 | Reyes et al. |
| 6,110,709 A | 8/2000 | Ausubel et al. |
| 6,150,112 A | 11/2000 | Weissman et al. |
| 6,159,685 A | 12/2000 | Pinkel et al. |
| 6,160,105 A | 12/2000 | Cunningham et al. |
| 6,169,194 B1 | 1/2001 | Thompson et al. |
| 6,172,208 B1 | 1/2001 | Cook |
| 6,174,680 B1 | 1/2001 | Makrigiorgos |
| 6,180,338 B1 | 1/2001 | Adams |
| 6,190,865 B1 | 2/2001 | Jendrisak et al. |
| 6,194,211 B1 | 2/2001 | Richards et al. |
| 6,197,501 B1 | 3/2001 | Cremer et al. |
| 6,197,557 B1 | 3/2001 | Makarov et al. |
| 6,210,891 B1 | 4/2001 | Nyren et al. |
| 6,225,109 B1 | 5/2001 | Juncosa et al. |
| 6,225,451 B1 | 5/2001 | Ballinger et al. |
| 6,232,104 B1 | 5/2001 | Lishanski et al. |
| 6,251,639 B1 | 6/2001 | Kurn |
| 6,262,490 B1 | 7/2001 | Hsu et al. |
| 6,270,961 B1 | 8/2001 | Drmanac |
| 6,280,935 B1 | 8/2001 | Macevicz |
| 6,287,766 B1 | 9/2001 | Nolan et al. |
| 6,287,825 B1 | 9/2001 | Weissman et al. |
| 6,291,170 B1 | 9/2001 | Van Gelder et al. |
| 6,306,365 B1 | 10/2001 | Ruoslahti et al. |
| 6,306,597 B1 | 10/2001 | Macevicz |
| 6,309,843 B1 | 10/2001 | Timms |
| 6,326,142 B1 | 12/2001 | Royer |
| 6,335,167 B1 | 1/2002 | Pinkel et al. |
| 6,339,147 B1 | 1/2002 | Lukhtanov et al. |
| 6,440,705 B1 | 8/2002 | Stanton, Jr. et al. |
| 6,449,562 B1 | 9/2002 | Chandler et al. |
| 6,582,938 B1 | 6/2003 | Su et al. |
| 6,670,461 B1 | 12/2003 | Wengel et al. |
| 6,686,156 B2 | 2/2004 | Kurn |
| 6,692,918 B2 | 2/2004 | Kurn |
| 6,770,748 B2 | 8/2004 | Imanishi et al. |
| 6,777,180 B1 | 8/2004 | Fisher et al. |
| 6,794,499 B2 | 9/2004 | Wengel et al. |
| 6,815,164 B2 | 11/2004 | Kurn |
| 6,815,167 B2 | 11/2004 | Crothers et al. |
| 6,825,011 B1 | 11/2004 | Romantchikov |
| 6,833,246 B2 | 12/2004 | Balasubramanian |
| 6,849,404 B2 | 2/2005 | Park et al. |
| 6,858,413 B2 | 2/2005 | Kurn |
| 6,913,884 B2 | 7/2005 | Stuelpnagel et al. |
| 6,917,726 B2 | 7/2005 | Levene et al. |
| 6,924,104 B2 | 8/2005 | Weissman et al. |
| 6,946,251 B2 | 9/2005 | Kurn |
| 7,001,724 B1 | 2/2006 | Greenfield |
| 7,033,764 B2 | 4/2006 | Korlach et al. |
| 7,048,481 B2 | 5/2006 | Sugata et al. |
| 7,052,847 B2 | 5/2006 | Korlach et al. |
| 7,056,676 B2 | 6/2006 | Korlach et al. |
| 7,056,716 B2 | 6/2006 | Potter et al. |
| 7,060,441 B2 | 6/2006 | Bourget et al. |
| 7,094,536 B2 | 8/2006 | Kurn |
| 7,115,400 B1 | 10/2006 | Adessi et al. |
| 7,170,050 B2 | 1/2007 | Turner et al. |
| 7,175,982 B1 | 2/2007 | McCarthy et al. |
| 7,176,025 B2 | 2/2007 | Kurn et al. |
| 7,189,512 B2 | 3/2007 | Porat et al. |
| 7,211,390 B2 | 5/2007 | Rothberg et al. |
| 7,232,656 B2 | 6/2007 | Balasubramanian et al. |
| 7,244,559 B2 | 7/2007 | Rothberg et al. |

(56) References Cited

U.S. PATENT DOCUMENTS

| | | |
|---|---|---|
| 7,244,567 B2 | 7/2007 | Chen et al. |
| 7,264,929 B2 | 9/2007 | Rothberg et al. |
| 7,273,730 B2 | 9/2007 | Du Breuil Lastrucci |
| 7,276,720 B2 | 10/2007 | Ulmer |
| 7,294,461 B2 | 11/2007 | Kurn |
| 7,300,755 B1 | 11/2007 | Petersdorf et al. |
| 7,302,146 B2 | 11/2007 | Turner et al. |
| 7,313,308 B2 | 12/2007 | Turner et al. |
| 7,315,019 B2 | 1/2008 | Turner et al. |
| 7,323,305 B2 | 1/2008 | Leamon et al. |
| 7,335,762 B2 | 2/2008 | Rothberg et al. |
| 7,351,557 B2 | 4/2008 | Kurn |
| 7,354,717 B2 | 4/2008 | Kurn |
| 7,361,466 B2 | 4/2008 | Korlach et al. |
| 7,361,468 B2 | 4/2008 | Liu et al. |
| 7,402,386 B2 | 7/2008 | Kurn et al. |
| 7,405,281 B2 | 7/2008 | Xu et al. |
| 7,414,117 B2 | 8/2008 | Saito et al. |
| 7,416,844 B2 | 8/2008 | Korlach et al. |
| 7,462,452 B2 | 12/2008 | Williams et al. |
| 7,462,468 B1 | 12/2008 | Williams et al. |
| 7,476,503 B2 | 1/2009 | Turner et al. |
| 7,476,504 B2 | 1/2009 | Turner |
| 7,491,498 B2 | 2/2009 | Lapidus et al. |
| 7,501,245 B2 | 3/2009 | Quake et al. |
| 7,579,153 B2 | 8/2009 | Brenner et al. |
| 7,704,687 B2 | 4/2010 | Wang et al. |
| 7,741,463 B2 | 6/2010 | Gormley et al. |
| 7,771,934 B2 | 8/2010 | Kurn |
| 7,771,946 B2 | 8/2010 | Kurn |
| 7,803,550 B2 | 9/2010 | Makarov et al. |
| 7,846,666 B2 | 12/2010 | Kurn |
| 7,846,733 B2 | 12/2010 | Kurn |
| 7,867,703 B2 | 1/2011 | Sampson et al. |
| 7,939,258 B2 | 5/2011 | Kurn et al. |
| 7,948,015 B2 | 5/2011 | Rothberg et al. |
| 7,985,565 B2 | 7/2011 | Mayer et al. |
| 8,017,335 B2 | 9/2011 | Smith |
| 8,034,568 B2 | 10/2011 | Kurn et al. |
| 8,053,192 B2 | 11/2011 | Bignell et al. |
| 8,071,311 B2 | 12/2011 | Kurn |
| 8,143,001 B2 | 3/2012 | Kurn et al. |
| 8,209,130 B1 | 6/2012 | Kennedy et al. |
| 8,334,116 B2 | 12/2012 | Kurn |
| 8,465,950 B2 | 6/2013 | Kurn et al. |
| 8,492,095 B2 | 7/2013 | Kurn |
| 8,512,956 B2 | 8/2013 | Kurn |
| 8,551,709 B2 | 10/2013 | Kurn et al. |
| 8,852,867 B2 | 10/2014 | Kurn et al. |
| 8,999,677 B1 | 4/2015 | Soldatov et al. |
| 9,175,325 B2 | 11/2015 | Kurn et al. |
| 9,175,336 B2 | 11/2015 | Soldatov et al. |
| 9,181,582 B2 | 11/2015 | Kurn |
| 9,206,418 B2 | 12/2015 | Armour |
| 9,248,076 B2 | 2/2016 | Sullivan et al. |
| 9,546,399 B2 | 1/2017 | Amorese et al. |
| 9,702,004 B2 | 7/2017 | Van Eijk et al. |
| 9,745,627 B2 | 8/2017 | van Eijk et al. |
| 9,896,721 B2 | 2/2018 | Van Eijk et al. |
| 2001/0000077 A1 | 3/2001 | Engelhardt et al. |
| 2001/0031739 A1 | 10/2001 | Dare |
| 2001/0034048 A1 | 10/2001 | Kurn |
| 2001/0041334 A1 | 11/2001 | Rashtchian et al. |
| 2002/0028447 A1 | 3/2002 | Li et al. |
| 2002/0058270 A1 | 5/2002 | Kurn |
| 2002/0115088 A1 | 8/2002 | Kurn |
| 2002/0150919 A1 | 10/2002 | Weismann et al. |
| 2002/0155451 A1 | 10/2002 | Makrigiorgos |
| 2002/0164628 A1 | 11/2002 | Kurn |
| 2002/0164634 A1 | 11/2002 | Patil et al. |
| 2002/0197639 A1 | 12/2002 | Shia et al. |
| 2003/0017591 A1 | 1/2003 | Kurn |
| 2003/0022207 A1 | 1/2003 | Balasubramanian et al. |
| 2003/0082543 A1 | 5/2003 | Su et al. |
| 2003/0087251 A1 | 5/2003 | Kurn |
| 2003/0119150 A1 | 6/2003 | Ankenbauer et al. |
| 2003/0143555 A1 | 7/2003 | Bourget et al. |
| 2003/0175780 A1 | 9/2003 | Jones |
| 2003/0180779 A1 | 9/2003 | Lofton-Day et al. |
| 2003/0186234 A1 | 10/2003 | Kurn |
| 2003/0207279 A1 | 11/2003 | Crothers et al. |
| 2003/0211616 A1* | 11/2003 | Leong .................... B01L 3/505 436/8 |
| 2003/0211619 A1* | 11/2003 | Olson ................ A61B 5/15146 436/44 |
| 2003/0215926 A1 | 11/2003 | Kurn et al. |
| 2003/0224439 A1 | 12/2003 | Lafferty et al. |
| 2003/0232348 A1 | 12/2003 | Jones et al. |
| 2004/0002371 A1 | 1/2004 | Paquin et al. |
| 2004/0005614 A1 | 1/2004 | Kurn et al. |
| 2004/0023271 A1 | 2/2004 | Kurn et al. |
| 2004/0115815 A1 | 6/2004 | Li et al. |
| 2004/0137456 A1 | 7/2004 | Yokota et al. |
| 2004/0161742 A1 | 8/2004 | Dean et al. |
| 2004/0203019 A1 | 10/2004 | Kurn |
| 2004/0203025 A1 | 10/2004 | Kurn |
| 2004/0248153 A1 | 12/2004 | Dear et al. |
| 2005/0003441 A1 | 1/2005 | Kurn |
| 2005/0014192 A1 | 1/2005 | Kurn |
| 2005/0019793 A1 | 1/2005 | Kurn et al. |
| 2005/0059048 A1 | 3/2005 | Gunderson et al. |
| 2005/0064456 A1 | 3/2005 | Kurn |
| 2005/0123956 A1 | 6/2005 | Blume et al. |
| 2005/0136417 A1 | 6/2005 | Cole et al. |
| 2005/0142577 A1 | 6/2005 | Jones et al. |
| 2005/0191656 A1 | 9/2005 | Drmanac et al. |
| 2005/0191682 A1 | 9/2005 | Barone et al. |
| 2005/0208538 A1 | 9/2005 | Kurn et al. |
| 2006/0008824 A1 | 1/2006 | Ronaghi et al. |
| 2006/0014182 A1 | 1/2006 | Kurn |
| 2006/0024678 A1 | 2/2006 | Buzby |
| 2006/0024711 A1 | 2/2006 | Lapidus et al. |
| 2006/0035274 A1 | 2/2006 | Dong |
| 2006/0046251 A1 | 3/2006 | Sampson et al. |
| 2006/0051789 A1 | 3/2006 | Kazakov et al. |
| 2006/0068415 A1 | 3/2006 | Jones et al. |
| 2006/0134633 A1 | 6/2006 | Chen et al. |
| 2006/0216724 A1 | 9/2006 | Christians et al. |
| 2006/0263789 A1 | 11/2006 | Kincaid |
| 2006/0281082 A1 | 12/2006 | Zhu |
| 2006/0286566 A1 | 12/2006 | Lapidus et al. |
| 2006/0292597 A1 | 12/2006 | Shapero et al. |
| 2007/0031857 A1 | 2/2007 | Makarov et al. |
| 2007/0134128 A1 | 6/2007 | Korlach |
| 2007/0141604 A1 | 6/2007 | Gormley et al. |
| 2007/0224607 A1 | 9/2007 | Morgan et al. |
| 2007/0224613 A1 | 9/2007 | Strathmann |
| 2007/0231823 A1 | 10/2007 | McKernan et al. |
| 2007/0238122 A1 | 10/2007 | Allbritton et al. |
| 2007/0263045 A1 | 11/2007 | Okazawa |
| 2008/0038727 A1 | 2/2008 | Spier |
| 2008/0087826 A1 | 4/2008 | Harris et al. |
| 2008/0103058 A1 | 5/2008 | Siddiqi |
| 2008/0131937 A1 | 6/2008 | Schroeder |
| 2008/0160580 A1 | 7/2008 | Adessi et al. |
| 2008/0176311 A1 | 7/2008 | Kurn |
| 2008/0182300 A1 | 7/2008 | Kurn |
| 2008/0194413 A1 | 8/2008 | Albert |
| 2008/0194416 A1 | 8/2008 | Chen |
| 2008/0206764 A1 | 8/2008 | Williams et al. |
| 2008/0213770 A1 | 9/2008 | Williams et al. |
| 2008/0217246 A1 | 9/2008 | Benn et al. |
| 2008/0241831 A1 | 10/2008 | Fan et al. |
| 2008/0242560 A1 | 10/2008 | Gunderson et al. |
| 2008/0286795 A1 | 11/2008 | Kawashima et al. |
| 2009/0011959 A1 | 1/2009 | Costa et al. |
| 2009/0024331 A1 | 1/2009 | Tomaney et al. |
| 2009/0026082 A1 | 1/2009 | Rothberg et al. |
| 2009/0029385 A1 | 1/2009 | Christians et al. |
| 2009/0036663 A1 | 2/2009 | Kurn |
| 2009/0061425 A1 | 3/2009 | Lo et al. |
| 2009/0061439 A1 | 3/2009 | Buzby |
| 2009/0068645 A1 | 3/2009 | Sibson |
| 2009/0068655 A1 | 3/2009 | Williams |

(56) References Cited

U.S. PATENT DOCUMENTS

| | | |
|---|---|---|
| 2009/0068709 A1 | 3/2009 | Kurn et al. |
| 2009/0105081 A1 | 4/2009 | Rodesch et al. |
| 2009/0117573 A1 | 5/2009 | Fu et al. |
| 2009/0117621 A1 | 5/2009 | Boutell et al. |
| 2009/0124514 A1 | 5/2009 | Fu et al. |
| 2009/0127589 A1 | 5/2009 | Rothberg et al. |
| 2009/0130721 A1 | 5/2009 | Kurn et al. |
| 2009/0203085 A1 | 8/2009 | Kurn et al. |
| 2009/0203531 A1 | 8/2009 | Kurn |
| 2009/0233802 A1 | 9/2009 | Bignell et al. |
| 2009/0233804 A1 | 9/2009 | Kurn et al. |
| 2009/0239232 A1 | 9/2009 | Kurn |
| 2009/0275486 A1 | 11/2009 | Kurn et al. |
| 2009/0280538 A1 | 11/2009 | Patel et al. |
| 2009/0298075 A1 | 12/2009 | Travers et al. |
| 2010/0015666 A1 | 1/2010 | Brenner et al. |
| 2010/0021973 A1 | 1/2010 | Makarov et al. |
| 2010/0022403 A1 | 1/2010 | Kurn et al. |
| 2010/0029511 A1 | 2/2010 | Raymond et al. |
| 2010/0105052 A1 | 4/2010 | Drmanac et al. |
| 2010/0113296 A1 | 5/2010 | Myerson |
| 2010/0129879 A1 | 5/2010 | Ach et al. |
| 2010/0137143 A1 | 6/2010 | Rothberg et al. |
| 2010/0159559 A1 | 6/2010 | Kurn et al. |
| 2010/0167954 A1 | 7/2010 | Earnshaw et al. |
| 2010/0173394 A1 | 7/2010 | Colston, Jr. et al. |
| 2010/0203597 A1 | 8/2010 | Chen et al. |
| 2010/0273219 A1 | 10/2010 | May et al. |
| 2010/0311066 A1 | 12/2010 | Kurn |
| 2010/0323348 A1 | 12/2010 | Hamady et al. |
| 2011/0015096 A1 | 1/2011 | Chiu |
| 2011/0039732 A1 | 2/2011 | Raymond et al. |
| 2011/0104785 A1 | 5/2011 | Vaidyanathan et al. |
| 2011/0105364 A1 | 5/2011 | Kurn |
| 2011/0129827 A1 | 6/2011 | Causey et al. |
| 2011/0186466 A1* | 8/2011 | Kurowski ......... B01L 3/502715 206/524.6 |
| 2011/0189679 A1 | 8/2011 | Kurn et al. |
| 2011/0224105 A1 | 9/2011 | Kurn et al. |
| 2011/0288780 A1 | 11/2011 | Rabinowitz et al. |
| 2011/0294132 A1 | 12/2011 | Kurn |
| 2011/0319290 A1 | 12/2011 | Raymond et al. |
| 2012/0003657 A1 | 1/2012 | Myllykangas et al. |
| 2012/0028310 A1 | 2/2012 | Kurn et al. |
| 2012/0045797 A1 | 2/2012 | Kurn et al. |
| 2012/0071331 A1 | 3/2012 | Casbon et al. |
| 2012/0074925 A1 | 3/2012 | Oliver |
| 2012/0102054 A1 | 4/2012 | Popescu et al. |
| 2012/0107811 A1* | 5/2012 | Kelso ............... B01L 3/502715 435/6.11 |
| 2012/0122701 A1 | 5/2012 | Ryan et al. |
| 2012/0149068 A1 | 6/2012 | Kurn |
| 2012/0156728 A1 | 6/2012 | Li et al. |
| 2012/0157322 A1 | 6/2012 | Myllykangas et al. |
| 2012/0190587 A1 | 7/2012 | Kurn et al. |
| 2012/0208705 A1 | 8/2012 | Steemers et al. |
| 2012/0220483 A1 | 8/2012 | Kurn et al. |
| 2012/0220494 A1 | 8/2012 | Samuels et al. |
| 2012/0237943 A1 | 9/2012 | Soldatov et al. |
| 2012/0238738 A1 | 9/2012 | Hendrickson |
| 2012/0245041 A1 | 9/2012 | Brenner et al. |
| 2012/0270212 A1 | 10/2012 | Rabinowitz et al. |
| 2012/0283145 A1 | 11/2012 | Wang |
| 2012/0289426 A1 | 11/2012 | Roos et al. |
| 2012/0309002 A1 | 12/2012 | Link |
| 2013/0005585 A1 | 1/2013 | Anderson et al. |
| 2013/0059738 A1 | 3/2013 | Leamon et al. |
| 2013/0231253 A1 | 9/2013 | Amorese et al. |
| 2014/0038188 A1 | 2/2014 | Kurn |
| 2014/0038236 A1 | 2/2014 | Kurn et al. |
| 2014/0065692 A1 | 3/2014 | Kurn et al. |
| 2014/0274729 A1 | 9/2014 | Kurn et al. |
| 2014/0274731 A1 | 9/2014 | Raymond et al. |
| 2014/0274738 A1 | 9/2014 | Amorese et al. |
| 2014/0303000 A1 | 10/2014 | Armour |
| 2014/0378345 A1 | 12/2014 | Hindson et al. |
| 2015/0011396 A1 | 1/2015 | Schroeder et al. |
| 2015/0017635 A1 | 1/2015 | Myllykangas et al. |
| 2015/0101595 A1 | 4/2015 | Hancock et al. |
| 2015/0133319 A1 | 5/2015 | Fu et al. |
| 2015/0190802 A1 | 7/2015 | Oppenheimer et al. |
| 2015/0284769 A1 | 10/2015 | Schroeder |
| 2015/0299767 A1 | 10/2015 | Armour et al. |
| 2015/0299784 A1 | 10/2015 | Fan et al. |
| 2015/0299812 A1 | 10/2015 | Talasaz |
| 2016/0122756 A1 | 5/2016 | Armour |
| 2016/0130576 A1 | 5/2016 | Armour |
| 2016/0153039 A1 | 6/2016 | Amorese et al. |
| 2016/0203259 A1 | 7/2016 | Scolnick et al. |
| 2016/0220994 A1* | 8/2016 | Wright ............ A61B 5/150022 |
| 2016/0251711 A1 | 9/2016 | Amorese et al. |
| 2016/0265042 A1 | 9/2016 | Schroeder et al. |
| 2016/0275240 A1 | 9/2016 | Huelga et al. |
| 2016/0296930 A1 | 10/2016 | Matear et al. |

FOREIGN PATENT DOCUMENTS

| | | |
|---|---|---|
| CN | 101565746 A | 10/2009 |
| CN | 105890722 A | 8/2016 |
| EP | 0365627 B1 | 12/1993 |
| EP | 0329822 B1 | 6/1994 |
| EP | 0667393 A2 | 8/1995 |
| EP | 1071811 B1 | 3/2002 |
| EP | 0843735 B1 | 7/2002 |
| EP | 2272976 A1 | 1/2011 |
| EP | 2322612 A1 | 5/2011 |
| EP | 2451973 A1 | 5/2012 |
| EP | 2511381 A1 | 10/2012 |
| EP | 1929039 B2 | 11/2013 |
| WO | 89/09284 A1 | 10/1989 |
| WO | 92/07951 A1 | 5/1992 |
| WO | 93/18052 A1 | 9/1993 |
| WO | 94/16090 A1 | 7/1994 |
| WO | 96/40998 A1 | 12/1996 |
| WO | 97/12061 A1 | 4/1997 |
| WO | 97/25416 A2 | 7/1997 |
| WO | 98/06736 A1 | 2/1998 |
| WO | 98/38296 A1 | 9/1998 |
| WO | 98/044151 A1 | 10/1998 |
| WO | 99/10540 A1 | 3/1999 |
| WO | 99/11819 A1 | 3/1999 |
| WO | 99/42618 A1 | 8/1999 |
| WO | 00/08208 A2 | 2/2000 |
| WO | 2000/09756 A1 | 2/2000 |
| WO | 00/018957 A1 | 4/2000 |
| WO | 00/39345 A1 | 7/2000 |
| WO | 00/52191 A1 | 9/2000 |
| WO | 2000/55364 A2 | 9/2000 |
| WO | 00/70039 A1 | 11/2000 |
| WO | 01/20035 A2 | 3/2001 |
| WO | 01/23613 A1 | 4/2001 |
| WO | 01/46464 A1 | 6/2001 |
| WO | 01/57248 A2 | 8/2001 |
| WO | 01/64952 A2 | 9/2001 |
| WO | 02/00938 A2 | 1/2002 |
| WO | 02/28876 A2 | 4/2002 |
| WO | 02/29117 A2 | 4/2002 |
| WO | 02/36821 A2 | 5/2002 |
| WO | 02/48402 A2 | 6/2002 |
| WO | 02/060318 A2 | 8/2002 |
| WO | 02/072772 A2 | 9/2002 |
| WO | 02/072773 A2 | 9/2002 |
| WO | 02/081753 A1 | 10/2002 |
| WO | 02/090584 A2 | 11/2002 |
| WO | 03/004690 A2 | 1/2003 |
| WO | 2003/002736 A2 | 1/2003 |
| WO | 2003/012118 A1 | 2/2003 |
| WO | 03/027259 A2 | 4/2003 |
| WO | 03/078645 A2 | 9/2003 |
| WO | 03/083435 A2 | 10/2003 |
| WO | 03/106642 A2 | 12/2003 |
| WO | 04/011665 A2 | 2/2004 |
| WO | 2004/070007 A2 | 8/2004 |
| WO | 2004/092418 A2 | 10/2004 |

(56) References Cited

FOREIGN PATENT DOCUMENTS

| | | |
|---|---|---|
| WO | 2005/003375 A2 | 1/2005 |
| WO | 2005/038427 A2 | 4/2005 |
| WO | 2005/065321 A2 | 7/2005 |
| WO | 2006/081222 A2 | 8/2006 |
| WO | 2006/086668 A2 | 8/2006 |
| WO | 2006/137733 A1 | 12/2006 |
| WO | 2007/018601 A1 | 2/2007 |
| WO | 2007/019444 A2 | 2/2007 |
| WO | 2007/030759 A2 | 3/2007 |
| WO | 2007/037678 A2 | 4/2007 |
| WO | 2007/052006 A1 | 5/2007 |
| WO | 2007/057652 A1 | 5/2007 |
| WO | 2007/073165 A1 | 6/2007 |
| WO | 2007/136717 A1 | 11/2007 |
| WO | 2008/005459 A2 | 1/2008 |
| WO | 2008/015396 A2 | 2/2008 |
| WO | 2008/033442 A2 | 3/2008 |
| WO | 2008/093098 A2 | 8/2008 |
| WO | 2008/115185 A2 | 9/2008 |
| WO | 2009/053039 A1 | 4/2009 |
| WO | 2009/102878 A2 | 8/2009 |
| WO | 2009/102896 A2 | 8/2009 |
| WO | 2009/112844 A1 | 9/2009 |
| WO | 2009/117698 A2 | 9/2009 |
| WO | 2009/120372 A2 | 10/2009 |
| WO | 2009/120374 A2 | 10/2009 |
| WO | 2010/003153 A2 | 1/2010 |
| WO | 2010/030683 A1 | 3/2010 |
| WO | 2010/039991 A2 | 4/2010 |
| WO | 2010/063711 A1 | 6/2010 |
| WO | 2010/064893 A1 | 6/2010 |
| WO | 2010/085715 A1 | 7/2010 |
| WO | 2010/091246 A2 | 8/2010 |
| WO | 2010/115154 A1 | 10/2010 |
| WO | 2010/129937 A2 | 11/2010 |
| WO | 2011/003630 A1 | 1/2011 |
| WO | 2011/009941 A1 | 1/2011 |
| WO | 2011/019964 A1 | 2/2011 |
| WO | 2011/032053 A1 | 3/2011 |
| WO | 2011032040 A1 | 3/2011 |
| WO | 2011/053987 A1 | 5/2011 |
| WO | 2011/151777 A1 | 12/2011 |
| WO | 2011/156529 A2 | 12/2011 |
| WO | 2012/013932 A1 | 2/2012 |
| WO | 2012/061832 A1 | 5/2012 |
| WO | 2012/054873 A3 | 8/2012 |
| WO | 2012/103154 A1 | 8/2012 |
| WO | 2013/059740 A1 | 4/2013 |
| WO | 2013/059746 A1 | 4/2013 |
| WO | 2013/112923 A1 | 8/2013 |
| WO | 2013/130512 A3 | 10/2013 |
| WO | 2013/177220 A1 | 11/2013 |
| WO | 2013/190441 A2 | 12/2013 |
| WO | 2013/191775 A2 | 12/2013 |
| WO | 2014/039556 A1 | 3/2014 |
| WO | 2014/082032 A1 | 5/2014 |
| WO | 2013/138510 A9 | 7/2014 |
| WO | 2014/144092 A1 | 9/2014 |
| WO | 2014/150931 A1 | 9/2014 |
| WO | 2015/031691 A1 | 3/2015 |
| WO | 2015/073711 A1 | 5/2015 |
| WO | 2015/131107 A1 | 9/2015 |

OTHER PUBLICATIONS

Wienholds, 2004, Target-selected gene inactivation in zebrafish, Meth Cell Biol 77:69-90.
Wolford, 2000, High-throughput SNP detection by using DNA pooling and denaturing high performance liquid chromatography (DHPLC), Hum Genet 107:483-487.
Xi, 2011, Copy number variation detection in whole-genome sequencing data using the Bayesian information criterion, PNAS 108(46):e1128-e1136.
Xu, 2012, FastUniq: A fast de novo duplicates removal tool for paired short reads, PLoSOne 7(12):e52249.
Amos, 2000, DNA pooling in mutation detection with reference to sequence analysis, Am J Hum Genet 66:1689-1692.
Bellos, 2014, cnvCapSeq: detecting copy number variation in long-range targeted resequencing data, Nucleic Acids Res 42(20):e158.
Benson, 2013, Genbank, Nucl Acids Res 41:D36-D42.
Blomquist, 2013, Targeted RNA-Sequencing with Competitive Multiplex-PCR Amplicon Libraries, PLOS ONE 8(11): e79120.
Bodi, 2013, Comparison of commercially available target enrichment methods for next-generation sequencing, J Biomolecular Tech 24:73-86.
Church, 1988, Multiplexed DNA sequencing, Science 240:185-188.
Colbert, 2001, High-throughput screening for induced point mutations, Plant Physiol 126:480-484.
Collard, 2005, An introduction to markers, quantitative trait loci (QTL) mapping and marker-assisted selection for crop improvements: the basic concepts Euphytica 142:169-196.
Eminaga, 2013, Quantification of microRNA Expression with Next-Generation Sequencing, Unit 4.17 in Current Protocols in Molecular Biology, Wiley, New York, NY (14 pages).
Fakhrai-Rad, 2002, Pyroseqeuncing: An accurate detection platform for single nucleotide polymorphisms, Human Mutation 19:479-485.
Grothues, 1993, PCR amplification of megabase DNA with tagged random primers (T-PCR), Nucl Acids Res 21:1321-1322.
Hajibabaei, 2005, Critical factors for assembling a high volume of DNA barcodes, Phil Trans R Soc B 360:1959-1967.
Illumina, 2011, TruSeq RNA and DNA Sample Preparation Kits v2, 1-15 Illumina, dated 27 Apr. 27, 2011 (4 pages).
International Search Report and Written Opinion dated Jan. 6, 2016, for PCT/US15/44065, filed Aug. 6, 2015 (21 pages).
International Search Report and Written Opinion dated Jul. 10, 2017, for Application No. PCT/US17/27060, filed Apr. 11, 2017 (9 pages).
International Search Report and Written Opinion dated Mar. 5, 2015, in international patent application PCT/US2014/065530, filed Nov. 13, 2014 (12 pages).
Ion Total RNA-Seq Kit v2, User Guide, 2012, Life Technologies (82 pages).
Jiang, 2015, CODEX: a normalization and copy number variation detection method for whole exome sequencing, Nucleic Acids Res 43(6):e39.
Krumm, 2012, Copy number variation detection and genotyping from exome sequence data, Genome Res 22(8):1525-1532.
Lai, 2004, Characterization of the maize endosperm transcriptome and its comparison to the rice genome, Genome Res 14:1932-1937.
Langmead, 2009, Ultrafast and memory-efficient alignment of short DNA sequences to the human genome, Genome Biol 10:R25.
Li, 2012, CONTRA: copy number analysis for targeted resequencing, Bioinformatics 28(10):1307-1313.
Lindstrom, 2004, Pyrosequencing for detection of Lamivudine-resistant Hepatitis B virus, J Clin Microb 42(10):4788-4795.
Liu, 2008, Sequence space coverage, entropy of genomes and the potential to detect non-human DNA in human samples, BMC Genomics 9(509):1-17.
Ma, 2015, Quantitative Analysis of Copy Number Variants Based on Real-Time LightCycler PCR, Curr Protoc Hum Genet 80:7.21.1-7.23.8.
Machine translation generated on Mar. 7, 2018, of CN 105890722 by website of European Patent Office (4 pages).
Margulies, 2005, Genorne sequencing in open microfabricated high density picoliter reactors, Nature 437(7057):376-380.
McCloskey, 2007, Encoding PCR products with batch-stamps and barcodes, Biochem Genet 45:761-767.
Miner, 2004, Molecular barcodes detect redundancy and contamination in hairpin-bisulfite PCR, Nucl Acids Res 32(17):e135.
Myers, 2013, Protocol for Creating Multiplexed miRNA Libraries for Use in Illumina Sequencing, Myers lab microRNA-seq Protocol, Hudson Alpha Institute for Biotechnology web site, dated May 2, 2013, (15 pages).
NuGEN, 2014, User Guide Ovation Target Enrichment System, NuGEN Technologies Inc., San Carlos, CA (45 pages).

(56) References Cited

OTHER PUBLICATIONS

Plagnol, 2012, A robust model for read count data in exome sequencing experiments and implications for copy number variant calling, Bioinformatics 28(21):2747-2754.
Qiu 2003, DNA sequence-based "bar-codes" for tracking the origins of expressed sequence tags from a maize cDNA library constructed using multiple mRNA sources, Plant Physiol 133:475-481.
Querfurth, 2012, Creation and application of immortalized bait libraries for targeted enrichment and next-generation sequencing, Biotechniques 52(6):375-380.
Ronaghi, 2001, Pyrosequencing sheds light on DNA sequencing, Genome Res 11:3-11.
Sathirapongsasuti, 2011, Exome sequencing-based copy-number variation and loss of heterozygosity detection: ExomeCNV, Bioinformatics 27(19):2648-2654.
Schiemer, 2011, Illumina TruSeq Adapters Demystified, Tufts University Core Facility XP055357867 (5 pages).
Shapero, 2001, SNP Genotyping by multiplexed solid-phase amplification and fluorescent minisequencing, Genome Res 11:1926-1934.
Shendure, 2005, Accurate multiplex polony sequencing of an evolved bacterial genome, Science 309:1728.
Soni, 2007, Progress toward ultrafast DNA sequencing using solid-state nanopores, Clin Chem 53(11):1996-2001.
Sood, 2006, Methods for reverse genetic screening in zebrafish by resequencing and TILLING, Methods 39:220-227.
Staroscik, 2004, Calculator for determining the number of copies of a template, URI Genomics, webpage archive dated Apr. 6, 2017 (1 page), Retreived from the internet on Mar. 7, 2018, from <https://web.archive.org/web/20170406174850/http://cels.uri.edu/gsc/cndna.html>.
Stratagene, 1998, Gene characterization kits, Stratagene Catalog, p. 39 (2 pages).
Supplementary European search report and opinion dated Jan. 30, 2018, for European patent application No. 15830393.3 (6 pages).
Till, 2003, Large-scale discovery of induced point mutations with high-throughput TILLING, Genome Res 13:524-530.
Trapnell, 2010, Transcript assembly and quantification by RNA-Seq reveals unannotated transcripts and isoform switching during cell differentiation, Nat Biotech 28:511-515.
Trapnell, 2013, Differential analysis of gene regulation at transcript resolution with RNA-seq, Nat Biotech 31:46-53.
Unemo, 2004, Molecular typing of Neisseria gonorrhoeae isolates by pyrosequencing of highly polymorphic segments of the porB gene, J Clin Microb 42(7):2926-2934.
Vigal, 2002, A review on SNP and other types of molecular markers and their use in animal genetics, Genet Sel Evol 34:275-305.
Walker, 1992, Strand displacement amplification—an isothermal, in vitro DNA amplification technique, Nucl Acids Res 20(7):1691-1696.
International Search Report and Written Opinion dated Dec. 14, 2018, for PCT/US2018/056717, filed Oct. 19, 2018.
Extended European Search Report issued in European Application No. 18868635, dated Jun. 8, 2021, 8 pages.

\* cited by examiner

REAGENT DELIVERY SYSTEM

TECHNICAL FIELD

The disclosure relates to reagent containment and delivery.

BACKGROUND

Many analytical techniques require the use of precise, and sometimes small, amounts of reagent. In molecular biology for example, reactions are often conducted in microfluidic environments and several reagents must be combined in precise amounts and ratios to ensure an acceptable result. Furthermore, many reactions are sensitive to contamination and reagents must therefore be stored and manipulated in a controlled environment. Various attempts to automate reagent delivery can remove some human error but come with their own shortcomings.

Existing methods of automated reagent delivery include robotic fluid handlers and microfluidic devices. Typically, fluid is distributed from a central reservoir into reaction wells. The hardware used in fluidic devices has many moving parts, is expensive, challenging to maintain, and large in size. Hardware that controls microfluidic chips is simpler, less expensive, and small but chips used for dispensing reagents and conducting reactions can be expensive. Hardware used with fluid handlers offers programmable flexibility but are expensive due in part to associated programming costs.

Microfluidic chips are less flexible, they can be difficult to customize, and costs can escalate with additional layers, precision requirements, and additional channels or reservoirs. Inkjets have been coupled to robotic platforms but they are typically dedicated to a particular reagent (not washed and refilled), have dead volumes, must be primed, and reagents must be kept cool prior to dispensing. Due to set-up time and reagent overfill (dead volumes) robotic platforms are most practical with large numbers of samples (e.g., greater than 96 samples to be run under identical conditions). For ease of design, microfluidic chips frequently process a single sample through multiple steps or multiple samples through a single step.

SUMMARY

The invention provides reagent delivery systems for the precise delivery of defined reagent volumes. According to the invention, delivery systems comprise a reservoir having a deformable portion that, when actuated, causes delivery of reagent contained therein through a nozzle integrated into a wall of the reservoir.

In a preferred embodiment, the delivery system is a blister pack comprising first and second barriers forming a reservoir for containing reagent. A nozzle is integrated in at least one of the barriers and at least one of the barriers forming the reservoir is deformable so as to push reagent through the nozzle upon actuation of the deformable portion. The reservoir can be of any convenient shape and size. A preferred system comprises a first deformable barrier and a second barrier comprising an integrated nozzle to form the reservoir. The nozzle may be fabricated into the second barrier or may simply comprise an opening through which reagent does not flow absent actuation of the deformable first barrier. The nozzle allows precise delivery of reagent upon actuation and avoids a "bulk" reagent dump or spray as is typical in blister pack rupture in other contexts.

A pre-determined volume of reagent is packaged into reservoirs to be stored or transported, ready for distribution into a reaction environment. Because the volumes of reagents are added to the reservoirs at a manufacturing or distribution point, in the precise amounts required for a given reaction, the potential for human errors at the bench top is avoided. Additionally, the reagents remain sealed in a controlled environment within the reservoir until immediately prior to use, minimizing the potential for contamination.

At the reaction site, reagents are distributed through the nozzle to direct evacuation of the reagent, manage reagent flow rates, or form droplets or otherwise manage delivery format of the reagent. Nozzles may be preformed in the reservoir or formed during an unsealing process (e.g., piercing the reservoir with an external nozzle).

At least one surface forming reagent-containing reservoirs is deformable, allowing the forcible evacuation of reagent. The rate of deformation and therefore the rate of reagent delivery can be controlled by varying the actuation force applied to the deformable portion of the reservoir. Reservoirs of the invention can be multiplexed. For instance, multiple reservoirs may be joined together on a sheet or plane and can be positioned to allow sequential addition of different reagents to a reaction at various times.

Reservoirs may be sealed by any of several methods after appropriate amounts of reagent have been added. A sealing film or foil may be applied to cover the nozzle opening and can be removed prior to evacuation of the reagent from the reservoir. The film or foil may be peeled away manually or by machine or may form a frangible seal and open in response to increased pressure within the reservoir (e.g., through deformation of the reservoir). The nozzle may comprise a valve that closes or opens to allow the contained reagent to be retained within or evacuated from the reservoir.

Sheets or planes may be optimized for machine manipulation and automated delivery of contained reagents. For example, a planar array of reservoirs may include through-holes or openings to allow for various additional reagents to be pipetted or otherwise added to a reaction chamber below the sheet to react with reagents expelled from the reservoirs. Sheets or planes may comprise indexing marks or notches to be read by a machine to indicate positioning of one or more of the reservoirs with relation to a reaction chamber or a manipulation tool (e.g., a plunger for deforming the reservoir and evacuating its contents). Accordingly, an automated reagent delivery apparatus of the invention may execute programmed instructions by identifying specific reagent-containing reservoirs and adding their contents to a reaction chamber in a certain sequence and at specific intervals.

Reagents may be stored in a central reservoir in a plane or sheet and distributed in designated portions to various other reservoirs through a manifold to be evacuated through nozzles into a reaction. For example, dry reagents may be stored in a series of reservoirs connected to a central, liquid-containing reservoir. The dry reagents may be more stable in that state, allowing for longer or easier storage. The liquid reagent may be distributed to the various reservoirs containing the dry reagents through a sealed manifold (maintaining a controlled environment and minimizing contamination) just prior to use.

Aspects of the invention may include a reagent delivery system comprising a reservoir defined by a first barrier and a second barrier wherein at least one of the first and second barriers comprises a deformable portion and at least one of the first and second barriers comprises a nozzle. The reservoir can be configured to discharge one or more reagents contained therein through the preformed nozzle upon actuation of the deformable portion.

The nozzle may be preformed and the reservoir can have an interior volume from about 5 µl to about 100 µl, inclusive. The nozzle may have a diameter from about 100 µm to about 600 µm inclusive. The nozzle may taper from a diameter of about 0.5 mm near an interior opening in the reservoir to a diameter of about 0.6 mm near an exterior opening outside the reservoir. Alternatively, the taper may be from about 1 mm near the interior to about 1.2 mm near the exterior or any combination in that range (e.g., 1/0.6 mm; 1.8 mm/1.2 mm).

The reservoir may be disposed in a plane or sheet comprising a plurality of reservoirs. The plane can include indexing marks for locating one or more of the plurality of reservoirs. The plane may include one or more openings.

The preformed nozzle may be configured to retain reagents in the reservoir until the deformable portion is actuated. The preformed nozzle can include a sealing member configured to seal the reagents in the reservoir until the deformable portion is actuated. The sealing member may be frangible. The sealing member may include a removable film. The sealing member can include a valve. The sealing member may also comprise a plug and the plug may be composed of either inert or active materials. Moreover, the plug may be ejected by the reagent contents when the reservoir is disrupted (i.e., when the frangible portion is actuated). Alternatively, the plug may be removed prior to actuation. It is also contemplated that the plug material is changed (thermally or otherwise) such that it no longer presents a barrier to ejection of reagents. The nozzle may also be separated from air in the reservoir by a hydrophobic mesh.

In certain aspects, the invention may include a reagent delivery system comprising a deformable reservoir comprising a preformed nozzle, an upper sealing layer coupled to a top of the deformable reservoir, and a removable lower sealing layer, releasably coupled to the preformed nozzle and, in combination with the upper sealing layer, sealing one or more reagents within the deformable reservoir. The system can be configured such that removal of the lower sealing layer allows for the one or more reagents to be dispensed through the preformed nozzle upon compression of the deformable reservoir.

The upper and/or lower sealing layer can include a polymer film. The upper and/or sealing layer may be coupled to the top of the deformable reservoir and/or the nozzle by a pressure sensitive adhesive. Reservoirs of the invention may comprise a plastic.

Aspects of the invention may include a reagent delivery system comprising a multilayered sheet comprising a blister layer comprising a plurality of sealed, deformable reservoirs with one or more reagents disposed therein, a piercing layer comprising a plurality of hollow piercing members, the piercing layer positioned proximate to the blister layer such that the plurality of hollow piercing members align with the plurality of sealed, deformable reservoirs, wherein each of the plurality of hollow piercing member comprises a nozzle opposite the blister layer. The multilayered sheet may be configured such that the blister layer does not normally contact the piercing layer but, upon application of a force compressing one of the plurality of sealed, deformable reservoirs toward a corresponding hollow piercing member, dispenses the one or more reagents through the nozzle of the corresponding hollow piercing member.

DETAILED DESCRIPTION

Systems and methods of the invention provide for affordable, automated distribution of accurate reagent volumes for use in reactions in fields such as molecular biology. Unit-fill reservoirs, or blisters, are used to store, transport, organize, and distribute specified reagent volumes for use in various reactions. The disclosed systems and methods allow for processing small numbers of samples through multiple steps with minimal set-up time and no dead volume or priming. Specific volumes of various reagents required for certain reactions are pre-packaged into reservoirs to be stored or transported, ready for distribution into a reaction environment. The reagents remain sealed in reservoirs until time for use, minimizing the potential for contamination. At the reaction site, reagents are distributed through a nozzle (preformed in the reservoir or as part of a piercing member) that directs evacuation of the reagent, manages reagent flow rates, or forms droplets or otherwise manages delivery format of the reagent.

Once filled at, for example, a kit manufacturer's site, reservoirs or blisters of the invention can be sealed with a membrane having a preformed nozzle for reagent delivery. A simple hardware device, manually or automatically operated, compresses these reagent filled blisters to dispense the contents of the blister into a reaction vessel situated below the nozzle. A preconfigured set of blisters and indexing marks allows for machine control of the distribution of multiple reagents and complex methods to be executed including processing of multiple samples simultaneously.

Figure 1:
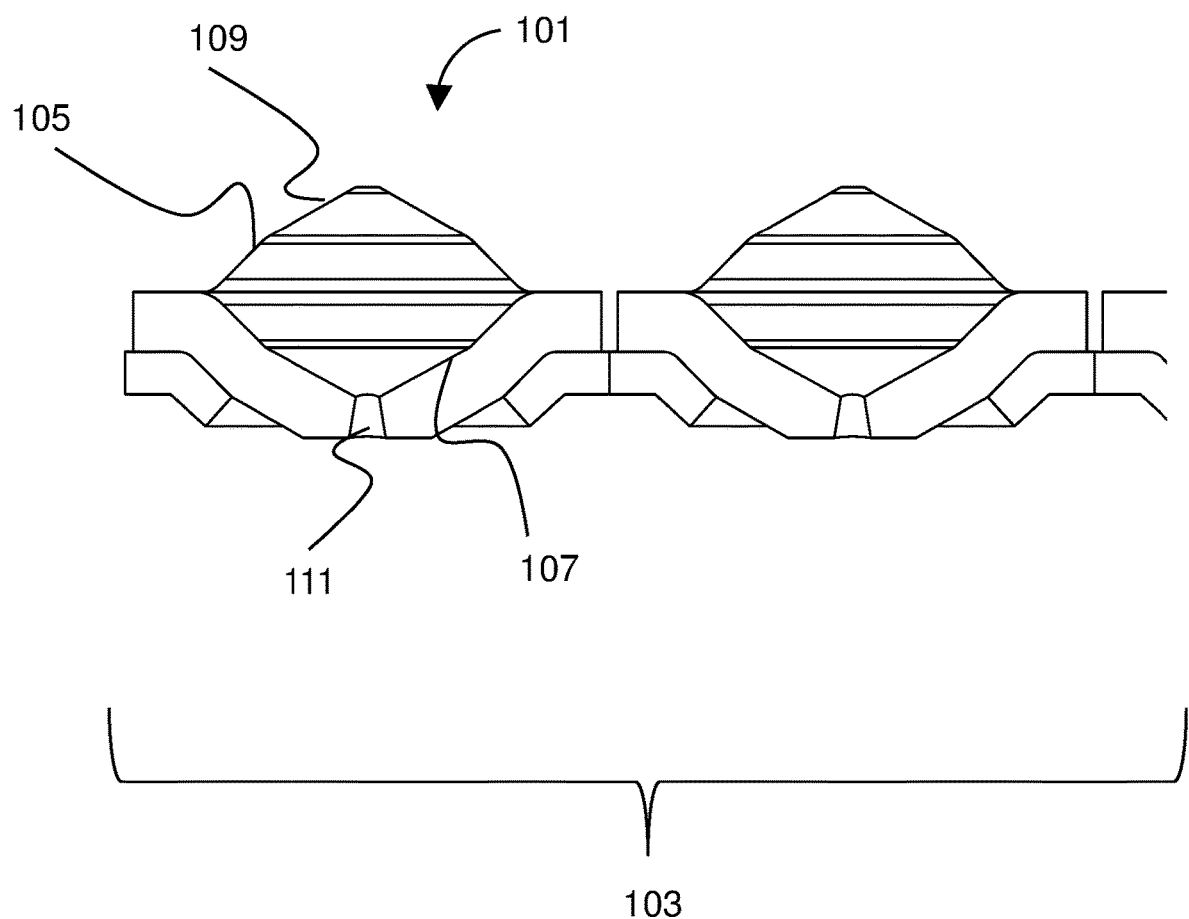
FIG. 1 shows a reservoir of the invention.

FIG. 1 shows a reservoir 101 as part of a sheet or plane 103 of multiple reservoirs 101 having a preformed nozzle 111, a first barrier 105 and a second barrier 107 configured to contain a reagent therein. The reservoir 101 also comprises a deformable portion 109 configured to collapse in response to an applied force, thereby decreasing the interior volume of the reservoir 101 and expelling the contained reagent through the nozzle 111. Reservoirs may be made out of any material including metals, glass, silicon, plastics, or composites. In certain embodiments, the deformable portion may be made of a plastic or other readily deformable material while the remaining components are formed from more rigid materials such as glass or metals. One of skill in the art will recognize that material selection will depend on several factors including avoiding reactivity with the reagents to be used with the system as well as physical considerations such as appropriate deformability and frangibility in embodiments such as those shown in FIGS. 6 and 7.

Figure 2:
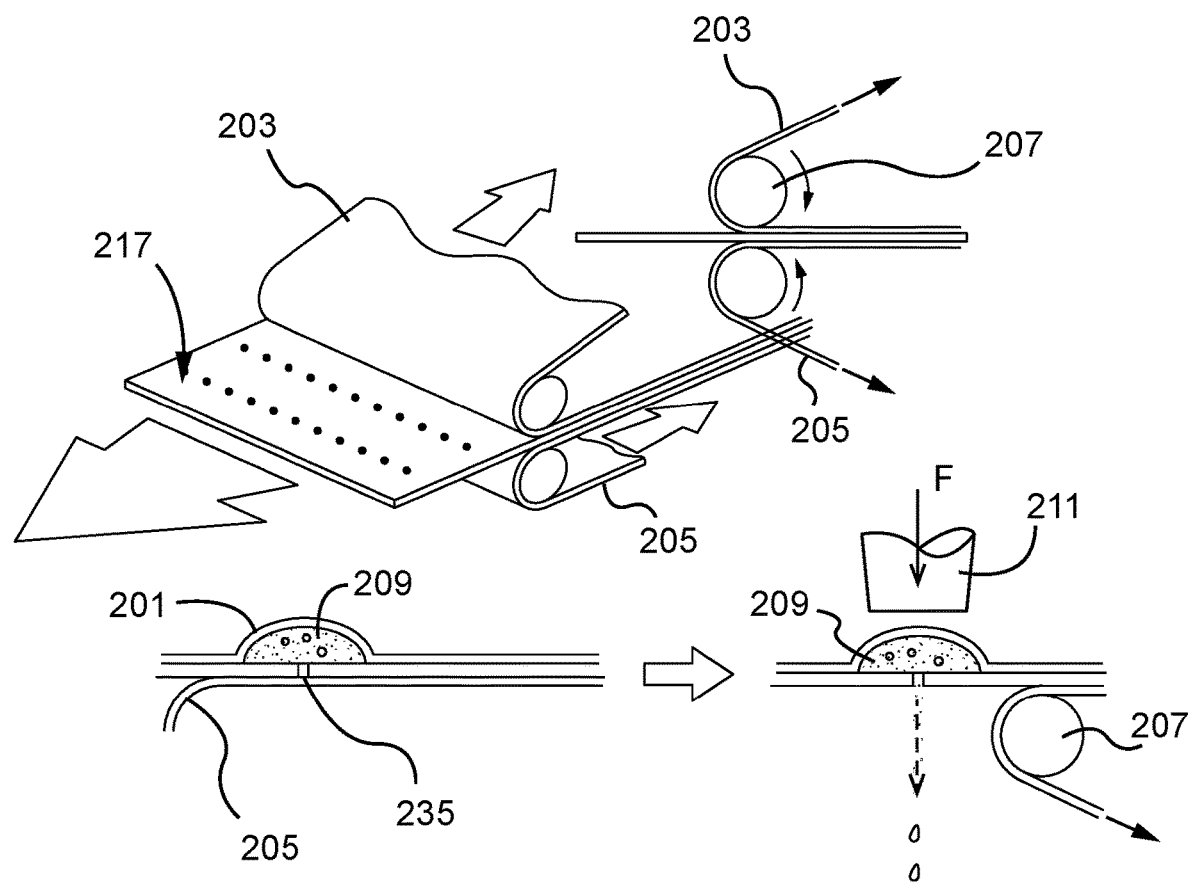
FIG. 2 shows a reservoir with a removable sealing layer.

FIG. 2 shows a sheet or plane 217 of reservoirs 201 with removable sealing layers. An upper sealing layer 203 and a lower sealing layer 205 are peeled away from the plane 217 as it passes by a pair of rollers 207 to expose the reagent volumes within the reservoirs 201. Once at least the lower sealing layer 205 is peeled away, exposing the nozzle 235 of each reservoir 201, a plunger 211 can be actuated to deform the reservoir 201 and force the contained reagent 209 out through the nozzle 235. The upper and/or lower sealing layers (203, 205) can be made of a foil or a polymer film for example and may be sealed to the plane 217 by a pressure sensitive adhesive. The plane 217 of reservoirs 201 may be fed through an apparatus comprising the rollers 207 and the plunger 211 configured to remove the sealing layers (203, 205) to unseal the reservoirs 201 and eject their reagent 209 contents into a reaction chamber.

Figure 3:
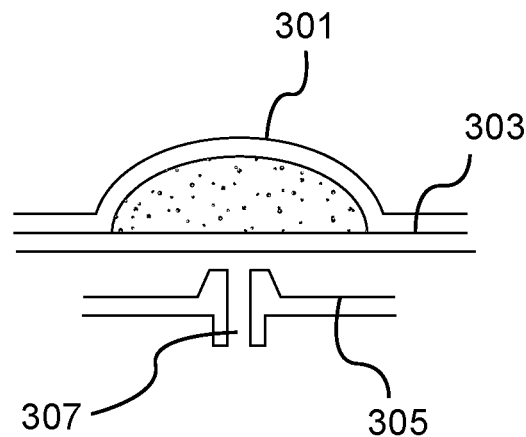
FIG. 3 shows a reservoir and a piercing nozzle as part of two separate layers of a plane.

FIG. 3 shows a reservoir 301 not having a preformed nozzle where the nozzle 307 is part of a piercing layer 305 adjacent to the blister layer 303 containing the various reservoirs 301. The combined piercing layer 305 and blister layer 303 make up a single reservoir sheet or plane and, when compressed together, the nozzle 307 of the piercing layer 305 pierces the corresponding reservoir 301 of the blister layer 303 and forms a nozzle 307 through which the reagent contained in the reservoir 301 may be evacuated.

Figure 4:
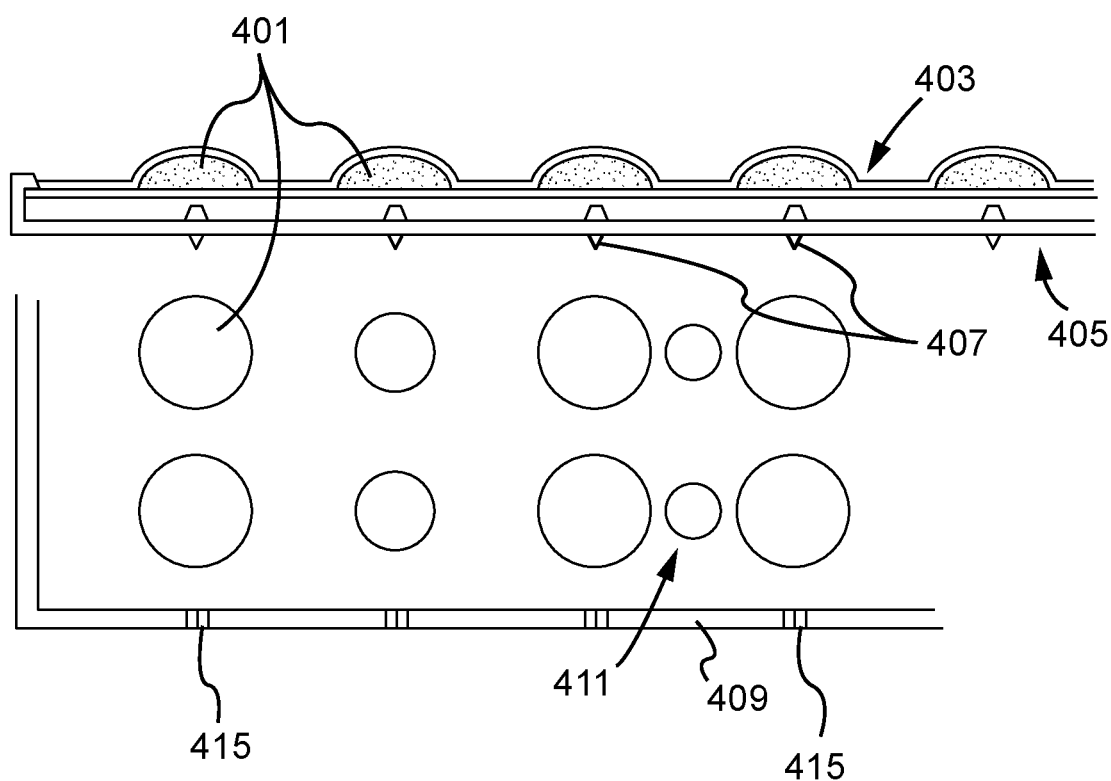
FIG. 4 shows a plane comprising a blister layer and piercing layer.

FIG. 4 illustrates a sheet or plane comprising multiple reservoirs 401 in a blister layer 403 and corresponding nozzles 407 in a piercing layer 405. The piercing layer 405 and blister layer 403 are positioned with respect to each other by a frame 409. The piercing 405 and/or blister layers 403 may have openings 411 through which additional reagents may be pipetted through into reaction chambers below the plane. The frame 409 or other locations on the plane may comprise indexing marks 415 or notches allowing for machine recognition and positioning of individual reservoirs 401 or rows of reservoirs 401 with respect to reaction chambers or plungers.

Figure 5:
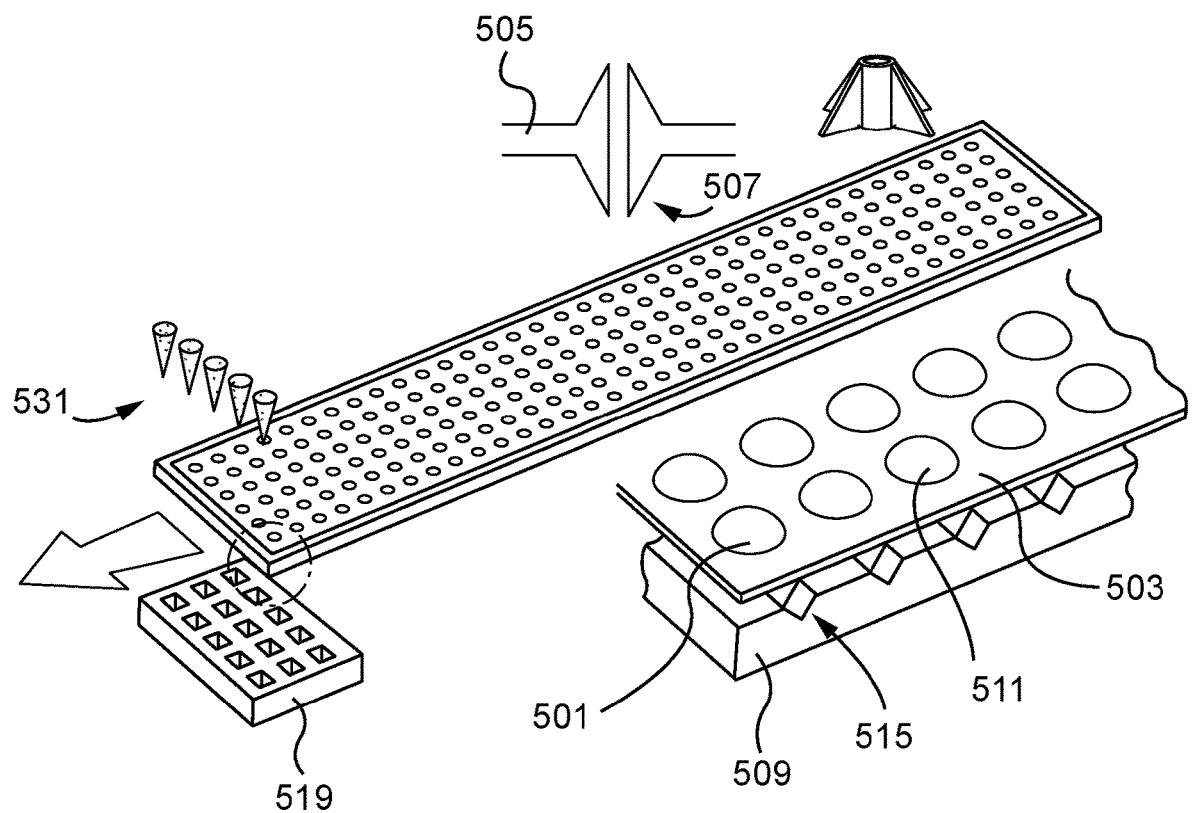
FIG. 5 shows a plane comprising a blister layer and a piercing layer with piercing nozzles and indexing notches.

FIG. 5 shows a reservoir plane comprising a blister layer 503 and a piercing layer 505 with piercing nozzles 507. The plane can be fed through an apparatus by manipulation of the frame 509 and positioned with respect to an awaiting reaction chamber 519 (e.g., a multi-well plate) through identification and manipulation of indexing notches 515. Pipette tips 531 may be manually or automatically operated to add additional reagents to the reaction chamber 519 through openings 511 in the blister layer 503 and piercing layer 505. The reservoirs 501 may be laid out on the blister layer 503 such that they correspond spatially to the wells of a specific type of plate or other reaction chamber 519 so that, upon actuation of a deformable portion, each reservoir 501 in a row or column may deposit a reagent into a single corresponding well of the plate below. Similarly, the openings 511 may be spaced so that they correspond to individual wells of a plate or other type of reaction chamber 519 below.

Figure 6:
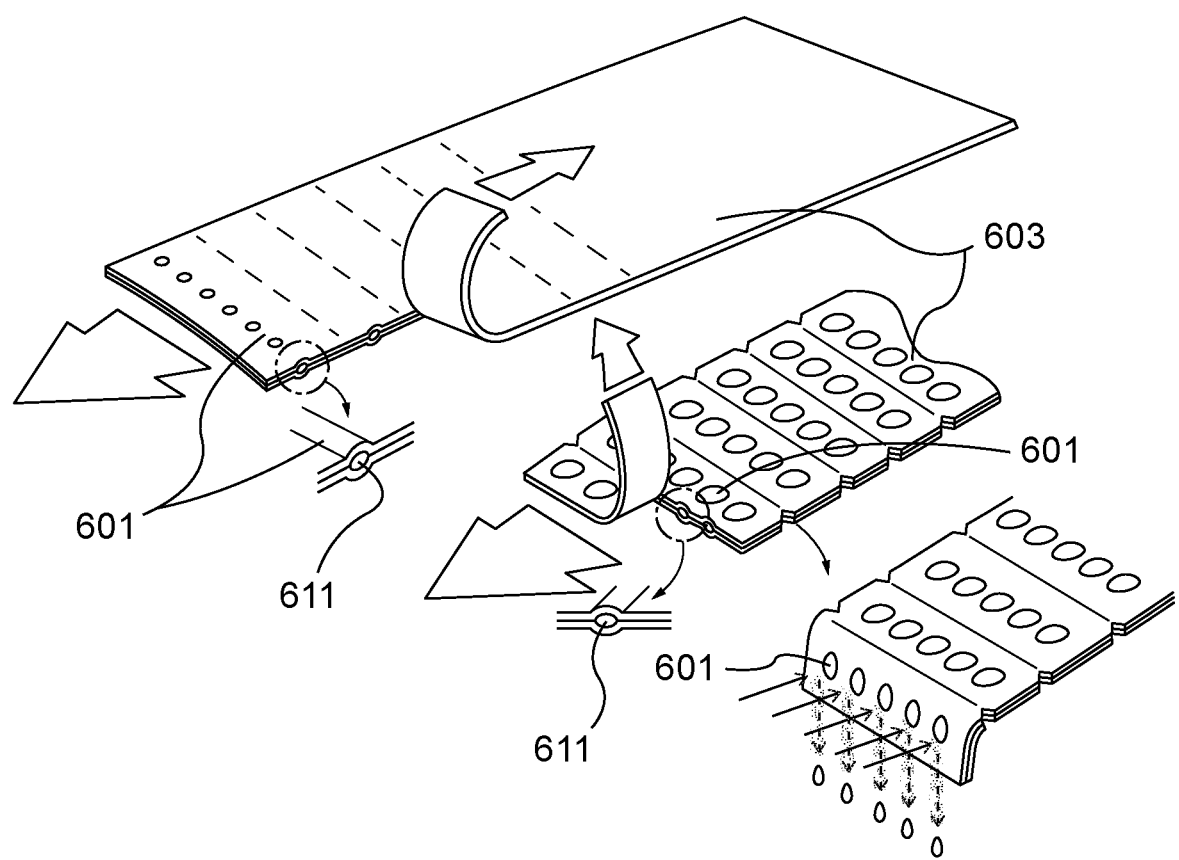
FIG. 6 shows a tear-away reservoir plane according to certain embodiments.

FIG. 6 shows a tear-away reservoir plane 603. The plane 603 may comprise perforated lines or otherwise frangible areas configured to tear away in response to an application of force as shown in FIG. 6. Rows of reservoirs 601 within the plane 603 may be associated with preformed nozzles 611 within each row. The nozzles 611 may be sealed in the plane 603 and the frangible sections of the plane may be configured such that by tearing away each previous row of reservoirs 601 the nozzles 611 of the next row are exposed. The plane 603 may then be optionally bent to direct the nozzles 611 to an awaiting reaction chamber and the contained reagents may be ejected into the chambers. The tear-away plane 603 may be configured to have each row removed by hand or in an automated process via an apparatus configured to feed the plane 603 row by row over a reaction chamber and to tear away each row after use, exposing the next row of nozzles 611.

Figure 7:
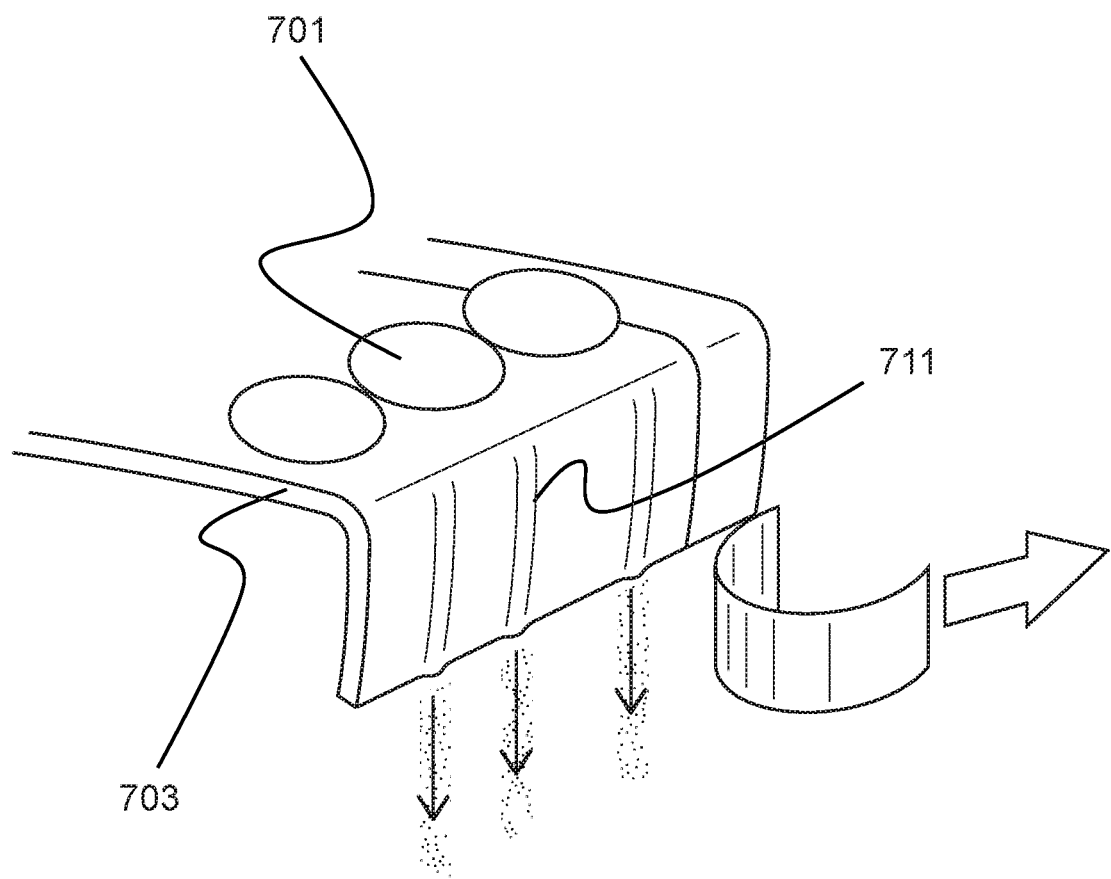
FIG. 7 shows reagent being excreted through nozzles in a tear away reservoir plane.

FIG. 7 shows reagent being excreted through nozzles 711 in a tear away reservoir plane 703. The plane 703 is bent, directing the exposed nozzles 711 downward and the reagent from each reservoir 701 is exiting through the nozzles 711. The nozzles 711 have been exposed through the peeling of a portion of the plane 703.

Figure 8:
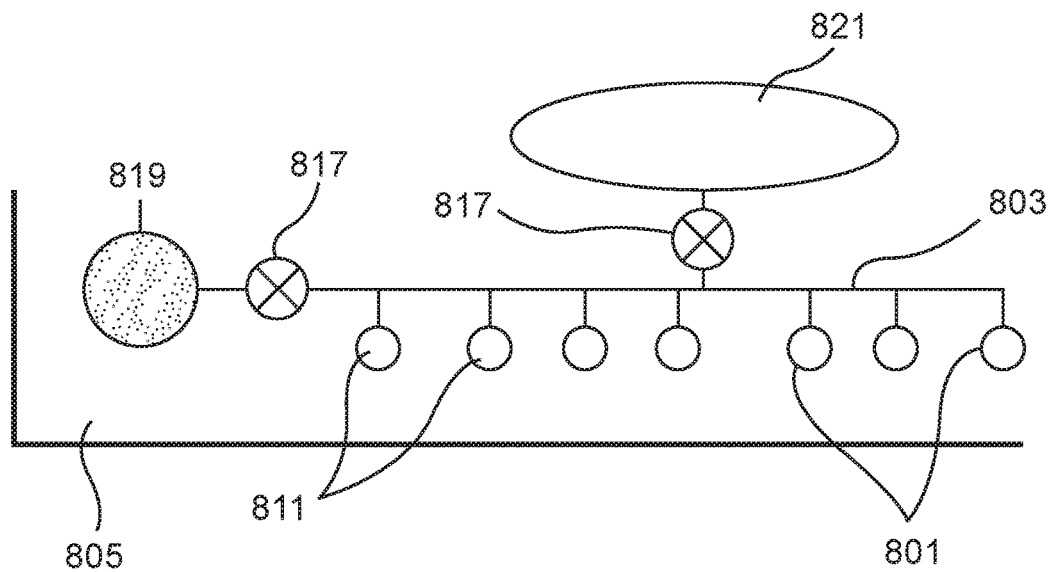
FIG. 8 shows a plane of reservoirs connected to a central reagent reservoir and an air pressure source via a manifold.

FIG. 8 shows a plane 805 of reservoirs 801 connected to a central reagent reservoir 819 and an air pressure source 821 via a distribution manifold 803. Each reservoir 801 comprises a preformed nozzle 811 that is sealed or otherwise configured to keep a reagent contained therein. The reagent reservoir 819 and the air pressure source 821 can each be coupled to the manifold via a valve 817. Pressure may be applied to the reagent reservoir 819 to distribute reagent to the various sealed reservoirs 801. Accordingly, a plane 805 may be prepared, shipped, and stored with reagent in a central reagent reservoir 819 and only distributed to the final nozzled reservoirs 801 just prior to ejection into a reaction chamber. The reagent reservoir 819 may be deformable so that application of pressure thereto forces the reagent to flow through the manifold 803 into the various other reservoirs 801. Alternatively, the reagent reservoir 819 may be pressurized such that, upon opening of a valve 817 coupling the reagent reservoir 819 to the manifold 803, reagent will flow to the lower pressure environment of the various reservoirs 801 for eventual ejection. The reservoirs 801 may be filled in a first process and then reagent ejected through nozzles 811 through a separate process. An air pressure source 821 such as a deformable reservoir filled with air or other gases or liquids may be coupled to the manifold 803 via a valve 817. After the reservoirs 801 have been filled with the appropriate amount of reagent from the reagent reservoir 819 the valve 817 coupling the reagent reservoir 819 to the manifold 803 may be closed. The valve 817 coupling the air pressure source 821 to the manifold 803 may then be opened and, through pressurization of the manifold 803 and the reservoirs 801, reagent may be forced through the nozzles 811 of each reservoir 801 into corresponding reaction chambers. The air pressure source 821 may be used in certain embodiments to spray the reagents through the nozzles 811 or to generate droplets by varying the amount of applied pressure. Alternatively a vacuum source may be applied to draw reagent into the reservoirs 801.

Figure 9:
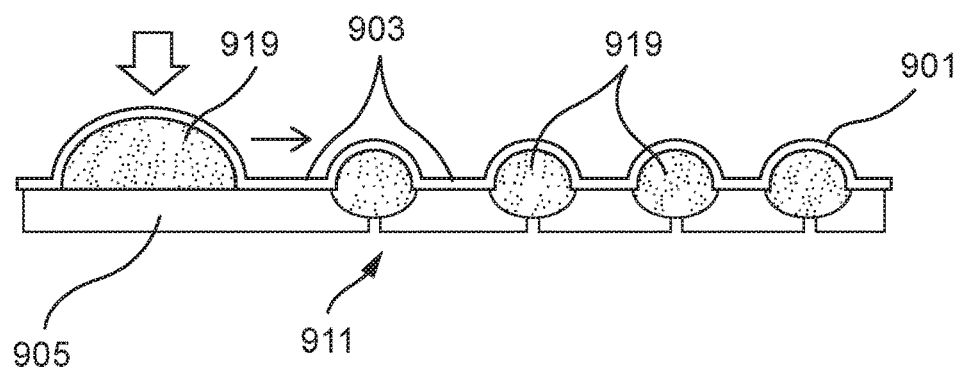
FIG. 9 shows a cut-away view of a plane of reservoirs filled via a central reagent reservoir.

FIG. 9 shows a cut-away view of a plane 905 of reservoirs 901 filled via a central reagent reservoir 919. Reservoirs 901 may be filled from a central reagent reservoir 919 prior to ejection through preformed nozzles 911 via a distribution manifold 903 that connects the reservoirs 901 in series as shown in FIG. 9. Alternatively the manifold 803 may connect the reservoirs 801 in parallel as shown in FIG. 8. Accordingly, each reservoir may be filled at the same time (e.g., parallel as in FIG. 8) from a central reagent reservoir or may be filled sequentially (e.g., in series as in FIG. 9). As shown in FIG. 9, each nozzle 911 may be sealed in such a way as to allow for the filling of each reservoir 901 before reagent is ejected through the nozzle 911. For example, a removable sealing layer may be held in place an only removed after distribution of reagent from the reagent reservoir 919 to the individual reservoirs 901. Alternatively the nozzle 911 seals may be frangible and configured such that the pressure required to rupture the seals is greater than the pressure required to distribute the reagent to the reservoirs 919. In the latter example, application of force to the reagent reservoir 919 would first fill each reservoir 901 through the manifold 903 and then, upon application of further force, the internal pressure will increase to the necessary amount to rupture the seals and eject the reagent from each of the nozzles 911.

Figure 10:
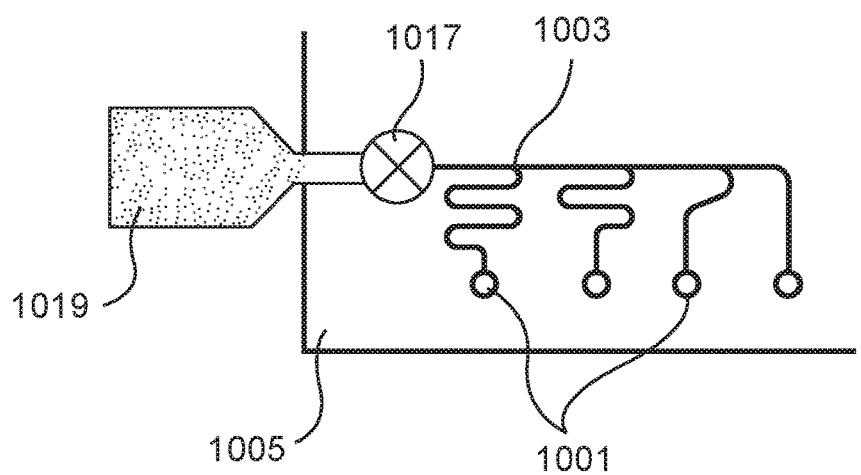
FIG. 10 shows a plane of reservoirs connected to a central reagent reservoir via different length manifold paths to equalize nozzle pressure.

Manifold 1003 runner length can be varied in a parallel system as shown in FIG. 10 control when reagent reaches each reservoir 1001 from the reagent reservoir 1019 after opening of valve 1017 and application of force to the deformable reagent reservoir 1019. By equalizing the length of the path that reagent must flow from the reagent reservoir 1019 to reach each reservoir 1001 in the plane 1005, nozzle pressure can be equalized across multiple reservoirs 1001.

In certain embodiments, reagents may be held in the reservoirs in a dry or inactive state, in component form, or in any state that may require activation, addition, or alteration before use in the intended reaction. For example, reagents may have a limited shelf life once prepared or may have specialized storage requirements (e.g., temperature or light requirements) to avoid degradation or adverse reactions. By storing reagents in a more stable form (e.g., component form, dry form, or inactive form) and reconstituting just prior to use, shelf life can be increased and better results can be obtained from subsequent reactions involving the reagents.

Figure 11:
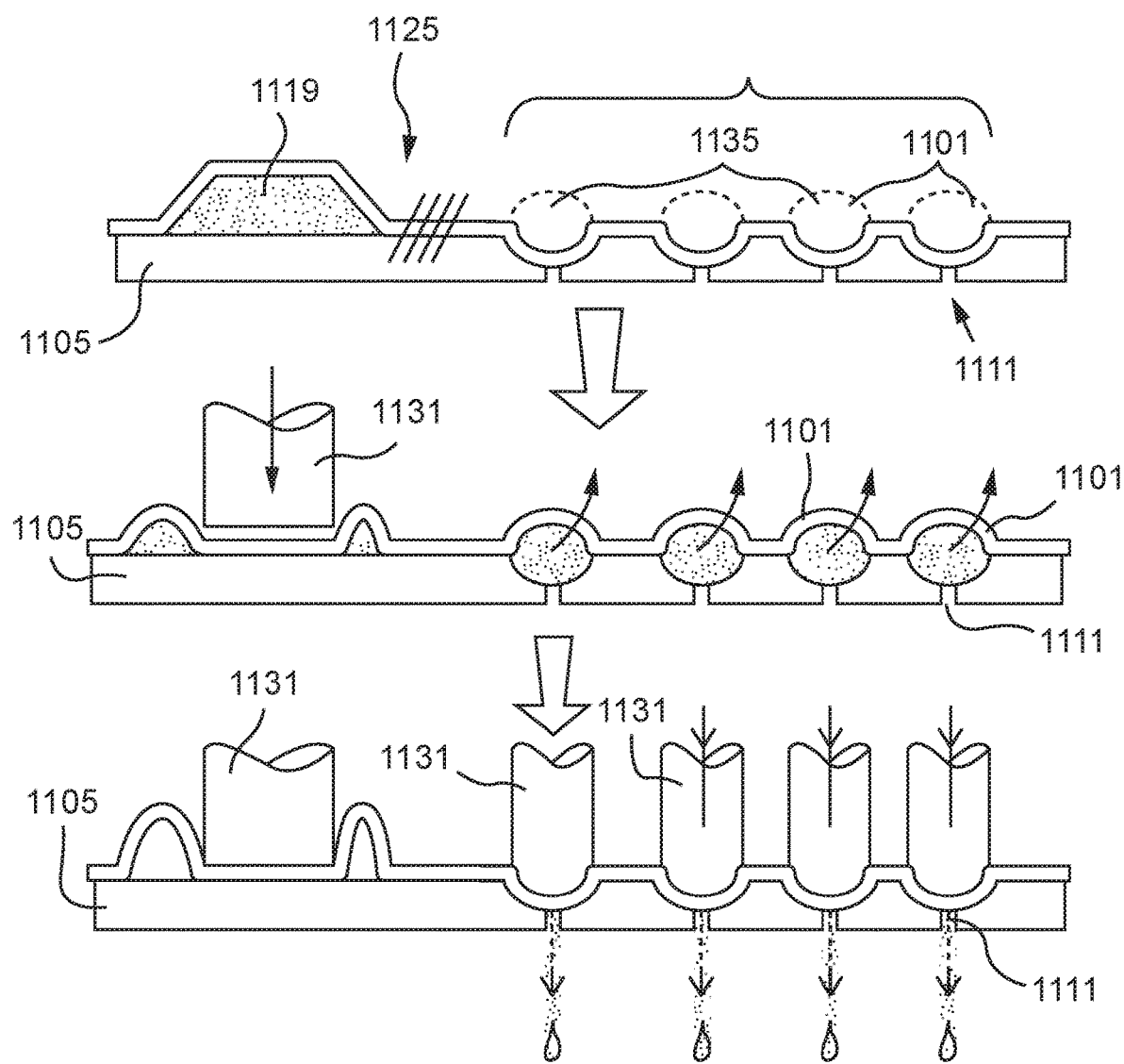
FIG. 11 shows a process for reconstituting dry reagents from a central reagent reservoir before ejecting the reconstituted reagents through nozzles in a reservoir plane.

FIG. 11 shows a process for reconstituting dry reagents 1135 using a central reagent reservoir 1119 before ejecting the reconstituted reagents through nozzles 1111 in a reservoir plane 1105. Similar to the systems shown in FIGS. 8-10, some required portion of the final reagent can be maintained in a central reagent reservoir 1119 coupled to the other reservoirs 1101 via a manifold 1125 and, optionally, a valve. A plunger 1131, for example controlled by an apparatus of the invention, can compress the reagent reservoir 1119 at some point prior to use of the reagents. The reagent portion (e.g., water) held in the reagent reservoir 1119 can then flow through the manifold 1125 to the various reservoirs 1101 where the remaining reagent components (e.g., a dry reagent powder 1135) are. Once combined within the various reservoirs 1101, the final reagent is ready for ejection through the nozzles 1111 of the reservoirs 1101 into an awaiting reaction vessel. Additional plungers 1131 may be used to compress the reservoirs and valves associated with the manifold 1125 may be closed to prevent backflow and force the reagents out through the nozzles 1111.

Figure 12:
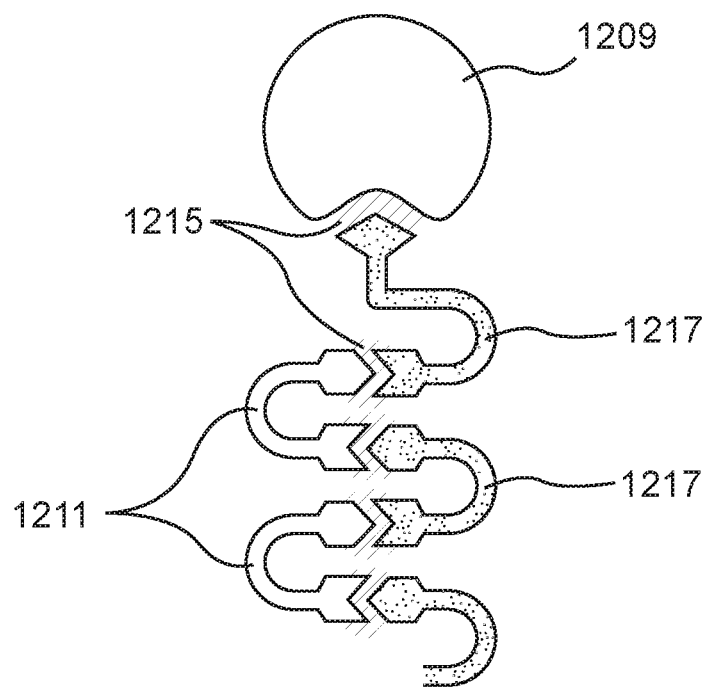
FIG. 12 shows a reservoir plane configured for sequential reagent ejection.

FIG. 12 shows a reservoir plane configured for sequential reagent ejection. A series of reagent reservoirs 1217 may be coupled to a series of ejection portions with nozzles 1211 by, for example, valves or frangible seals 1215. Reagents can be held in the reagent reservoirs 1217 separate from the ejection portions for storage and transport. A pressure source 1209 such as a deformable gas-filled reservoir may be coupled by a valve or frangible seal 1215 to the first of the reagent reservoirs 1217. The vales or frangible seals 1215 may be configured such that application of a certain amount of pressure from the pressure source 1209 will rupture the frangible seals 1215 sequentially forcing the reagent from the first reagent reservoir 1217 into the adjoining ejection portion and out of the nozzle 1211 before then rupturing the frangible seal 1215 connecting the next reagent reservoir 1217 and forcing the reagent therein into its adjoining ejection portion and out of its nozzle 1211. Alternatively connections between the various reagent reservoirs 1217 and ejection portions 1211 may be controlled by valves that are selectively opened and closed to provide access to the pressure source 1209.

Figure 13:
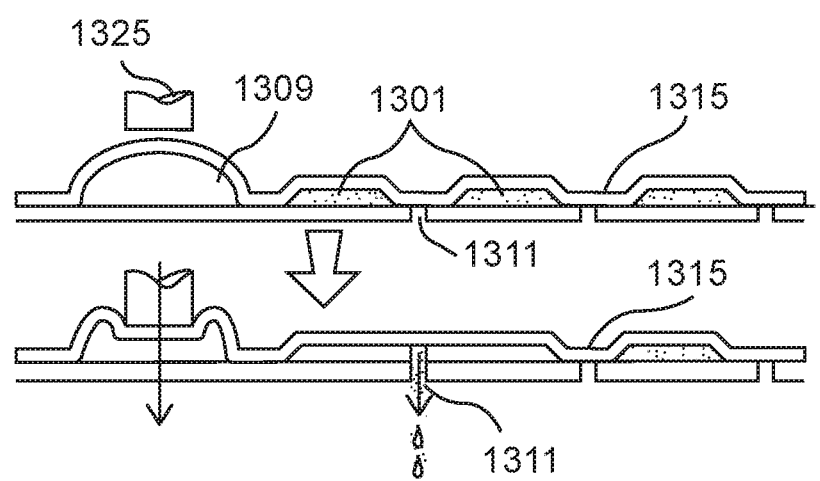
FIG. 13 shows a cut-away view of a reservoir plane configured for sequential reagent ejection.

FIG. 13 shows a cut-away view of a reservoir plane configured for sequential reagent ejection. As in FIG. 12, the pressure source 1309 may be compressed (e.g., by a plunger 1325) to increase internal pressure within the system to a point that a series of frangible seals 1313 rupture sequentially forcing reagents from a reagent reservoir 1301 out of a previously sealed adjoining nozzle 1311

Figure 14:
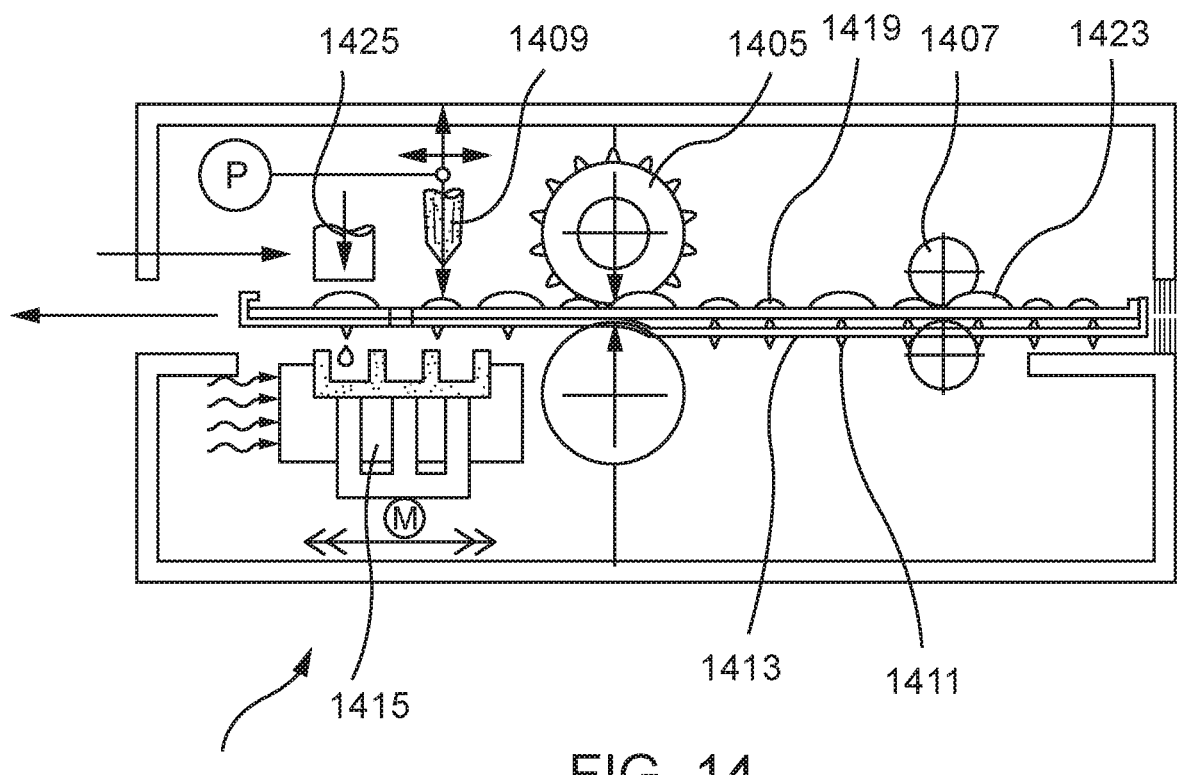
FIG. 14 shows an apparatus for automated processing of a reservoir plane comprising piercing and blister layers.

As noted, the reservoirs and reservoir planes discussed herein may be configured for automated use through an apparatus 1401 to further decrease opportunity for human error and ensure fidelity to reaction protocols. An example of such an apparatus 1401 is shown in FIG. 14. A reservoir plane, for example comprising a blister layer 1419 and a piercing layer 1413 as described above, can be fed into the apparatus 1401 through a port. The port may be sized or otherwise configured to only allow the reservoir plane to be inserted in one orientation to prevent errors. A feed roller 1407 interacts with the edges of the plane to draw it into the apparatus and move it along within the apparatus 1401 for processing while maintaining separation between the piercing layer 1413 and the blister layer 1419. Various portions of the apparatus 1401 may be cooled and/or heated depending on the requirements of reagent storage and reaction protocols. A piercing/indexing roller 1405 can then compress the piercing layer 1413 into the blister layer 1419 causing nozzles 1411 in the piercing layer 1413 to pierce the reagent containing reservoirs 1423. The piercing/indexing roller 1405 can interact with indexing marks or notches in the plane to identify and locate various rows of reservoirs 1323 with respect to other fixed components of the apparatus 1401. Subsequent to the piercing/indexing roller 1405, the plane is moved to a position above a reaction chamber 1415 (e.g., a multi-well plate). The reaction chamber 1415 maybe on a stage and can be subjected to controlled heating, cooling, shaking, magnetic manipulation, or other actions within the apparatus 1401 depending on the requirements of the reaction protocol. A series of automated pipettes 1409 may be positioned to add reagents to the reaction chamber 1415 through openings in the piercing 1413 and blister 1419 layers as the openings pass between the pipettes 1409 and the reaction chamber 1415. A manipulator such as a plunger 1425 or row of plungers 1425 is positioned above the reaction chamber 1415 and configured to compress a deformable portion of one or more reservoirs 1423 in one or more rows of the plane to eject their respective reagent contents into the reaction chamber 1415 below (e.g., one or more wells of a multi-well plate). The used plane or sheet can then be fed out of the apparatus 1401 through an exit port. The apparatus 1401 can be configured to exchange multiple reaction chambers 1415 at the stage beneath the plungers 1425 to conduct multiple reactions from a single reservoir plane.

A plane may comprise a sequence of reagents in a series of rows such that an entire reaction can be carried out by sequentially compressing each row's reservoirs. Each row may contain a single reagent and correspond to a well in a multi-well plate or a row of reaction chambers. Accordingly, a number of similar experiments may be performed simultaneously corresponding to the number of reservoirs in each row. The number of reagents needed to be added and the sequence in which they need to be added will dictate the number and position of the rows. The number of columns will correspond to the number of experiments simultaneously being performed.

Figure 15:
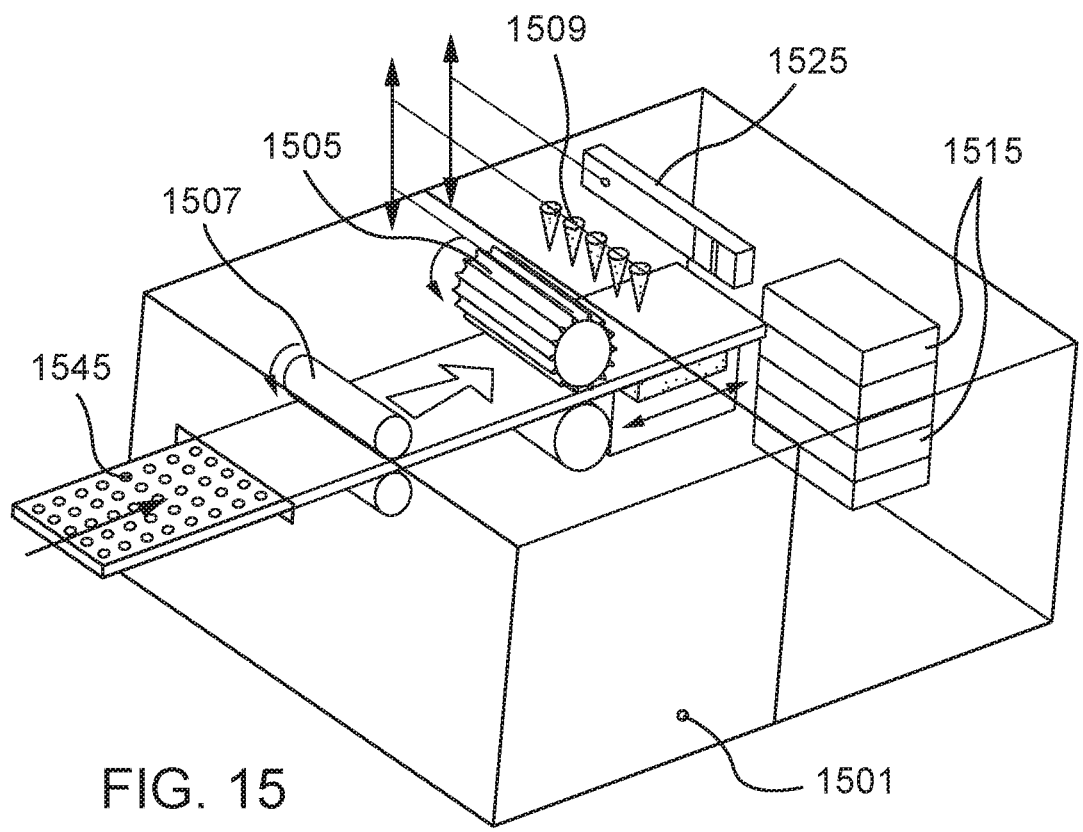
FIG. 15 shows an apparatus for automated reagent delivery to a series of multi-well plates.

Another exemplary apparatus 1501 is shown in FIG. 15. A reservoir plane 1545, as described above, can be fed into the apparatus 1501 through a port. A feed roller 1507 interacts with the plane 1555 to draw it into the apparatus 1501 and move it along within the apparatus 1501 for processing. Various portions of the apparatus 1501 may be cooled and/or heated depending on the requirements of reagent storage and reaction protocols. An indexing roller 1505 interacts with indexing marks or notches in the plane 1545 to identify and locate various rows of reservoirs with respect to other fixed components of the apparatus 1501. Subsequent to the indexing roller 1505, the plane 1545 is moved to a position above a stage to which any of multiple multi-well plates 1515 can be added and positioned such that the wells correspond spatially to the rows of reservoirs and openings in the plane 1545 as it is manipulated above by a plunger block 1525 and/or pipettes 1509. The stage can be subjected to controlled heating, cooling, shaking, magnetic manipulation, or other actions within the apparatus 1501 depending on the requirements of the reaction protocol.

EXAMPLE 1

Initial studies anticipated a blister/nozzle combination behaving similar to an inkjet where nozzle diameter would be small and blister compression critical to efficient droplet delivery. Surprisingly, a significantly larger diameter nozzle performed best and its efficiency was largely independent of blister compression characteristics (force or speed). A preferred nozzle diameter is from about 100 μm to about 600 μm, inclusive. Additionally there was concern that the presence of air in the blister would result in satellite formation (spray) as air was forced out with the liquid as is experienced with inkjets. The observation was that use of larger nozzles minimized this phenomenon. This resulted in an additional benefit that blisters did not need to be closely paired with reagent volumes. Additionally, standard size blisters could be filled with different volumes. The third unanticipated benefit to using the larger nozzles was that the dispensing efficiency was largely independent of the solution viscosity within the range of reagents investigated (aqueous solutions with and without salts, surfactants, and glycerol).

Results were obtained by producing prototypes of the blister packs with simple machining methods. A circular cavity was machined into a thin plastic carrier. On the ejection side, a polymer film containing a small aperture or nozzle (created by laser drilling) was attached using a pressure-sensitive adhesive (PSA). Next, the reagents to be ejected were pipetted onto the carrier. Finally, the blister was closed by attaching a vacuum-formed blister layer using a PSA. Ejection of stored reagents was then actuated by means of a linear electromechanical motor which can be set to a target speed.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A reagent delivery system comprising:
   a stage;
   a multi-well plate positioned on the stage;
   at least one plunger;
   an indexing roller; and
   a blister pack positioned above the multi-well plate and below the plunger and comprising:
      an array of reagent reservoirs, each reagent reservoir comprising a deformable first barrier and a second barrier comprising an integrated nozzle, wherein actuation of the plunger on a reservoir of the array deforms the first barrier and discharging reagent contained therein through the nozzle into a well of the multi-well plate; and
      indexing marks for identifying a position of one or more of the reservoirs relative to the plunger and a one or more wells of the multi-well plate for receiving discharged reagent, and wherein the indexing marks comprise notches that the indexing roller uses to manipulate the array relative to the plunger and the one or more wells of the plate.

2. The system of claim 1, wherein the nozzle comprises a frangible valve.

3. The system of claim 1, wherein the nozzle comprises an opening that retains reagent until said reagent is forced through said opening upon actuation of said deformable barrier.

4. The reagent delivery system of claim 1, wherein the reservoir has an interior volume of from about 5 ul to about 100 ul.

5. The reagent delivery system of claim 1, wherein the nozzle has a diameter of about 100 μm to about 600 μm.

6. The reagent delivery system of claim 1, wherein the nozzle tapers from about 0.5 mm at an interior opening in the reservoir to about 0.6 mm near an opening outside the reservoir.

7. The reagent delivery system of claim 1, wherein the nozzle comprises a sealing member configured to seal the reagents in the reservoir until the deformable barrier is deformed by the actuated plunger.

8. The system of claim 7, wherein the sealing member is frangible.

9. The system of claim 7, wherein the sealing member comprises a removable film.

10. The reagent delivery system of claim 1, wherein the array comprises one or more through-holes configured to allow an additional reagent to be added to one or more wells of the multi-well plate through the array.

11. The reagent delivery system of claim 1, wherein the plurality of reservoirs are disposed in the array in a plurality of rows and each indexing mark corresponds to one of the plurality of rows.

12. The reagent system of claim 1, wherein the wells of the multi-well plate can be subjected to controlled heating, cooling, shaking, and/or magnetic manipulation in the reagent system.

13. The reagent system of claim 1, wherein the system is configured to exchange the multi-well plate on the stage.

* * * * *